(12) United States Patent
Jackson

(10) Patent No.: US 9,873,486 B2
(45) Date of Patent: Jan. 23, 2018

(54) AIR CHAMBER HULL

(71) Applicant: Orin Jackson, Hauula, HI (US)

(72) Inventor: Orin Jackson, Hauula, HI (US)

( * ) Notice: Subject to any disclaimer, the term of this patent is extended or adjusted under 35 U.S.C. 154(b) by 75 days.

(21) Appl. No.: 14/639,949

(22) Filed: Mar. 5, 2015

(65) Prior Publication Data

US 2015/0314831 A1    Nov. 5, 2015

Related U.S. Application Data

(60) Provisional application No. 61/948,438, filed on Mar. 5, 2014.

(51) Int. Cl.

| | |
|---|---|
| *B63B 3/38* | (2006.01) |
| *B63B 1/12* | (2006.01) |
| *B63B 1/04* | (2006.01) |
| *B63B 1/06* | (2006.01) |
| *B63B 1/10* | (2006.01) |
| *B63B 39/10* | (2006.01) |
| *B63H 1/14* | (2006.01) |
| *B63B 1/22* | (2006.01) |
| *B63B 1/38* | (2006.01) |
| *B63H 1/18* | (2006.01) |
| *B63H 21/17* | (2006.01) |

(52) U.S. Cl.
CPC ............... *B63B 1/121* (2013.01); *B63B 1/04* (2013.01); *B63B 1/06* (2013.01); *B63B 1/10* (2013.01); *B63B 1/22* (2013.01); *B63B 1/38* (2013.01); *B63B 3/38* (2013.01); *B63B 39/10* (2013.01); *B63H 1/14* (2013.01); *B63B 2003/387* (2013.01); *B63H 2001/185* (2013.01); *B63H 2021/173* (2013.01); *Y02T 70/122* (2013.01); *Y02T 70/5263* (2013.01)

(58) Field of Classification Search
CPC .................................. B63B 1/38; B60V 1/046
See application file for complete search history.

(56) References Cited

U.S. PATENT DOCUMENTS

| | | | | |
|---|---|---|---|---|
| 3,146,752 A | * | 9/1964 | Ford ...................... | B60V 1/046 |
| | | | | 114/284 |
| 3,486,577 A | * | 12/1969 | Jackes ..................... | B60V 1/22 |
| | | | | 180/120 |

* cited by examiner

*Primary Examiner* — Edwin Swinehart
(74) *Attorney, Agent, or Firm* — Hawaii Patent Services; Nathaniel K. Fedde

(57) ABSTRACT

This invention provides a water craft hull having an air chamber, wherein the sidewalls of the air chamber extend lower than the fore wall and the aft wall of the air chamber, and wherein the hull comprises at least one air injector configured to deliver pressurized air to the air chamber. Optionally, a hull of the invention has a high aspect ratio air chamber defined by a stable fore wall, a stable aft wall, and stable sidewalls, is a non-planing hull, has a wave-piercing bow, and has elongated keel fins (e.g. inner keel fins and/or outer keel fins). Optionally, the air chamber is configured for recirculating air flow.

14 Claims, 36 Drawing Sheets

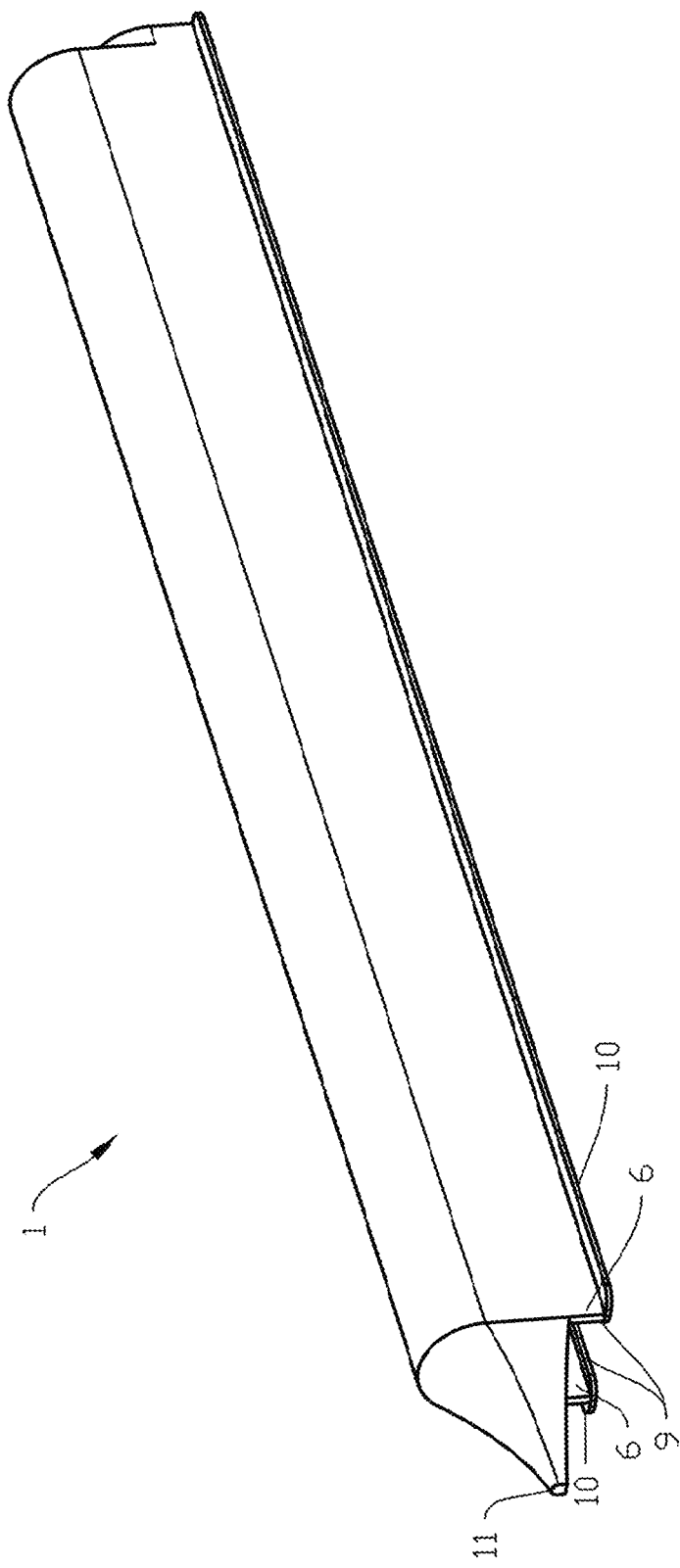

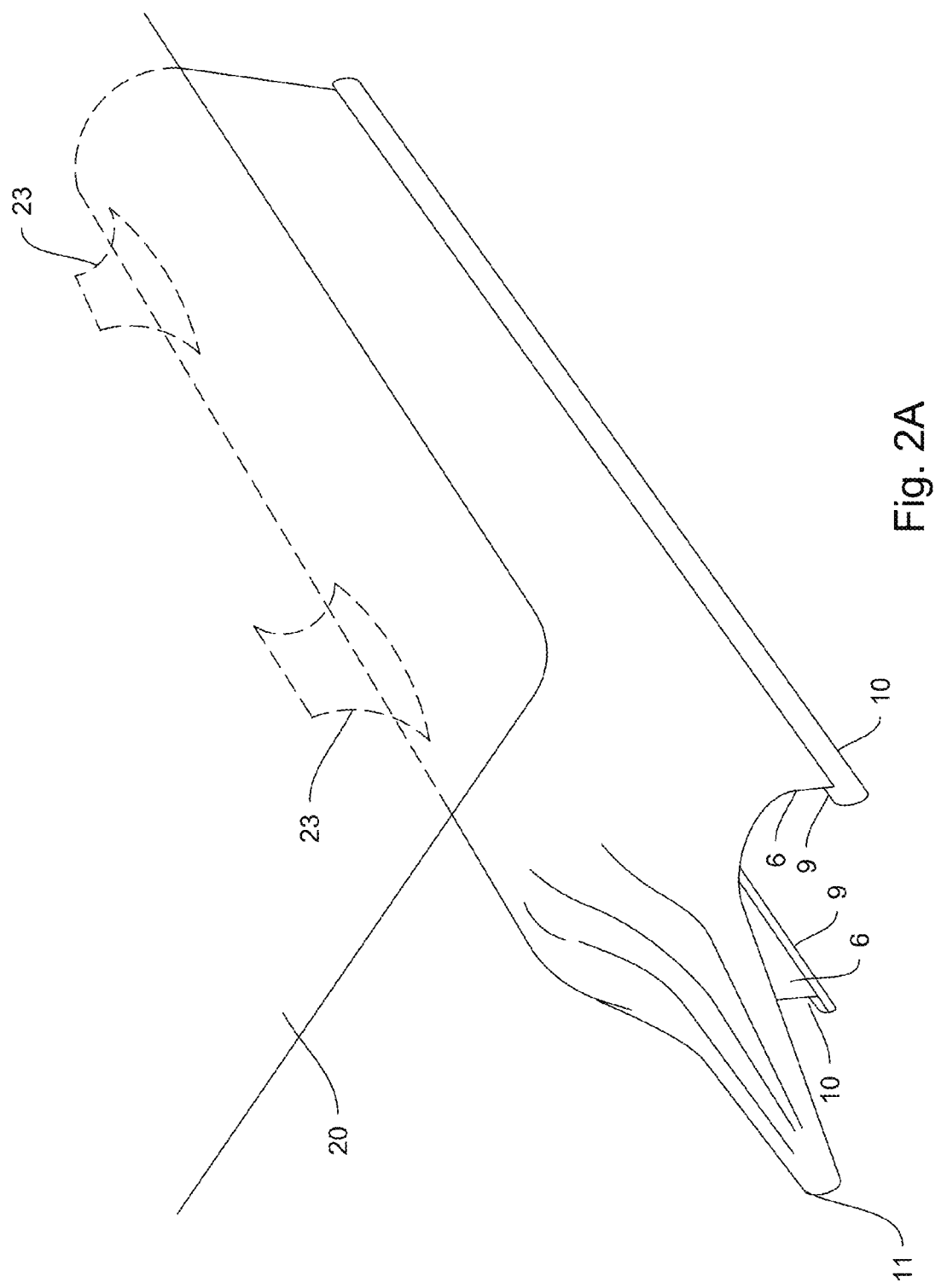

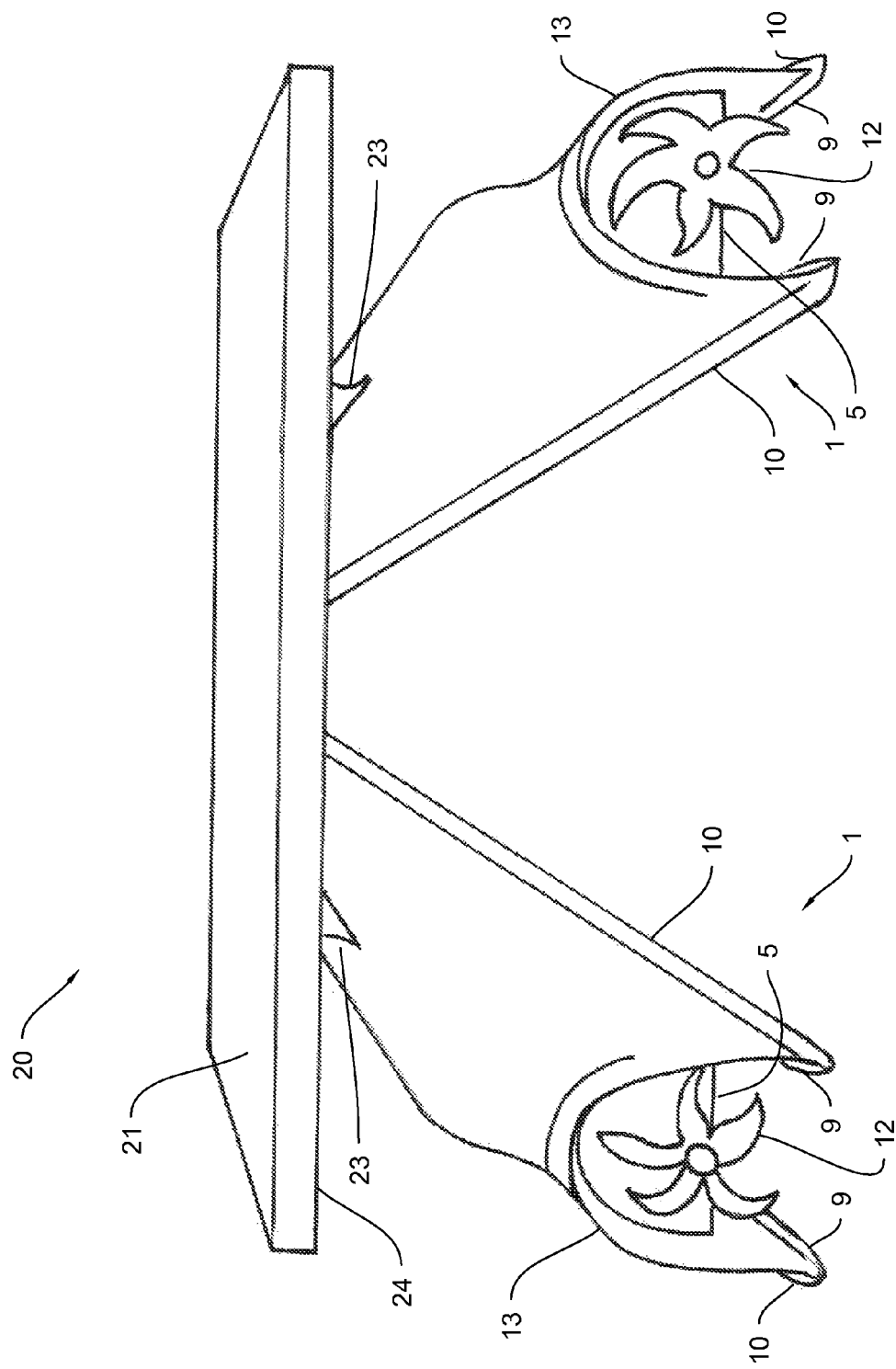

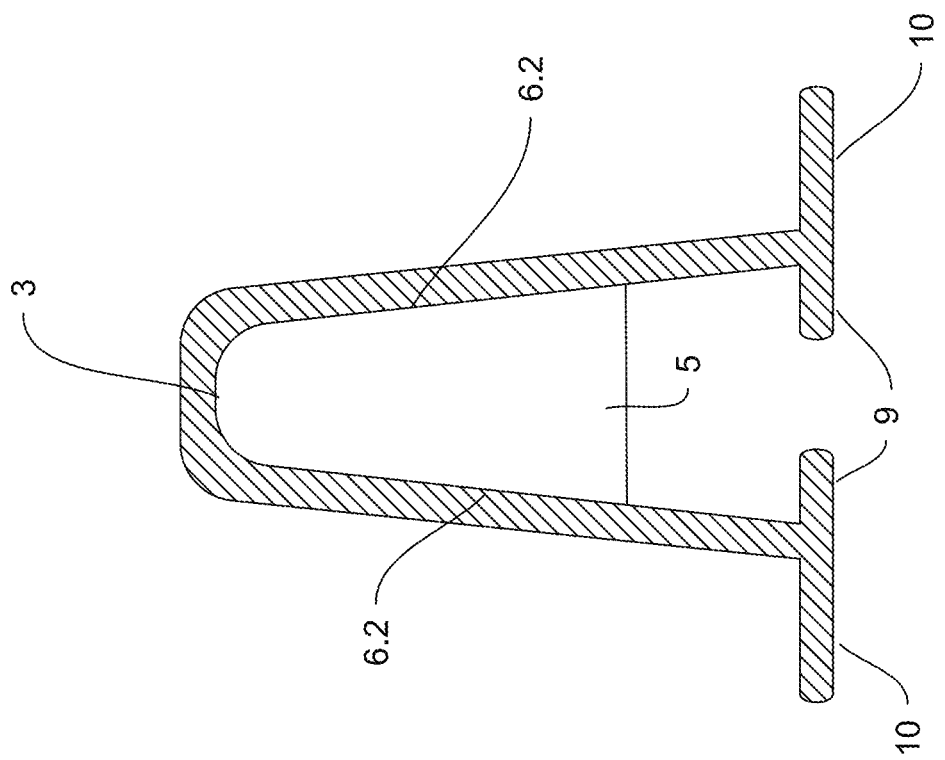
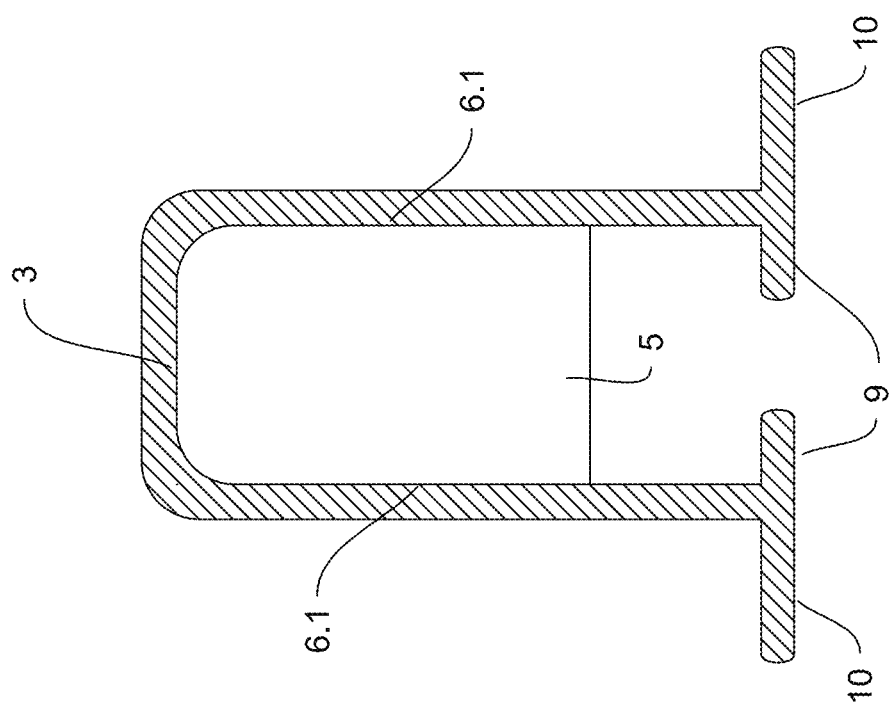

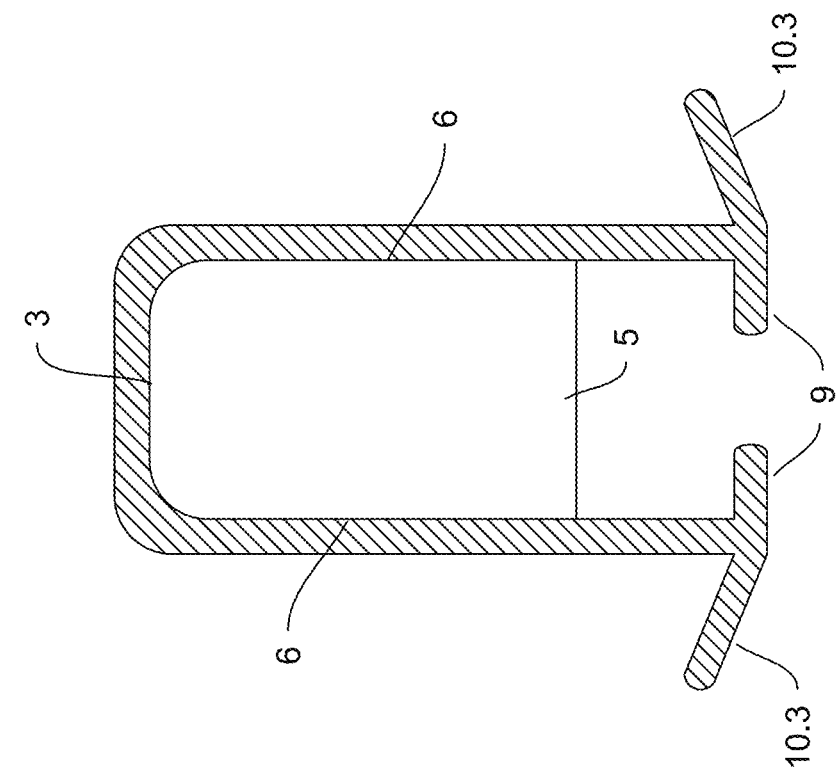
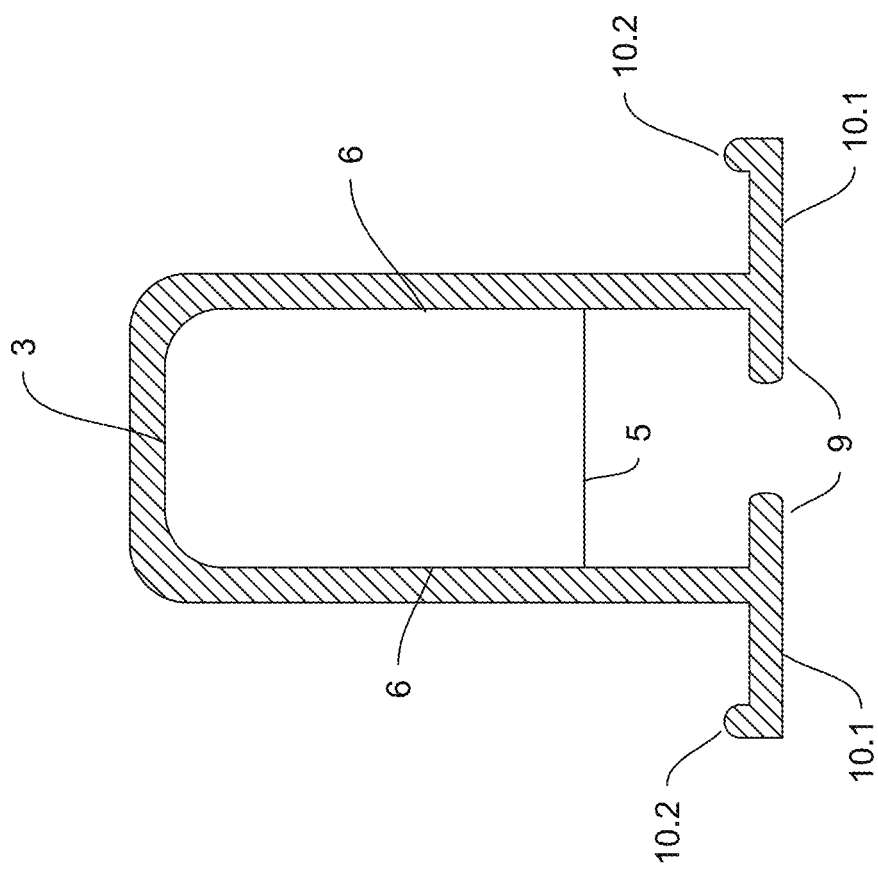

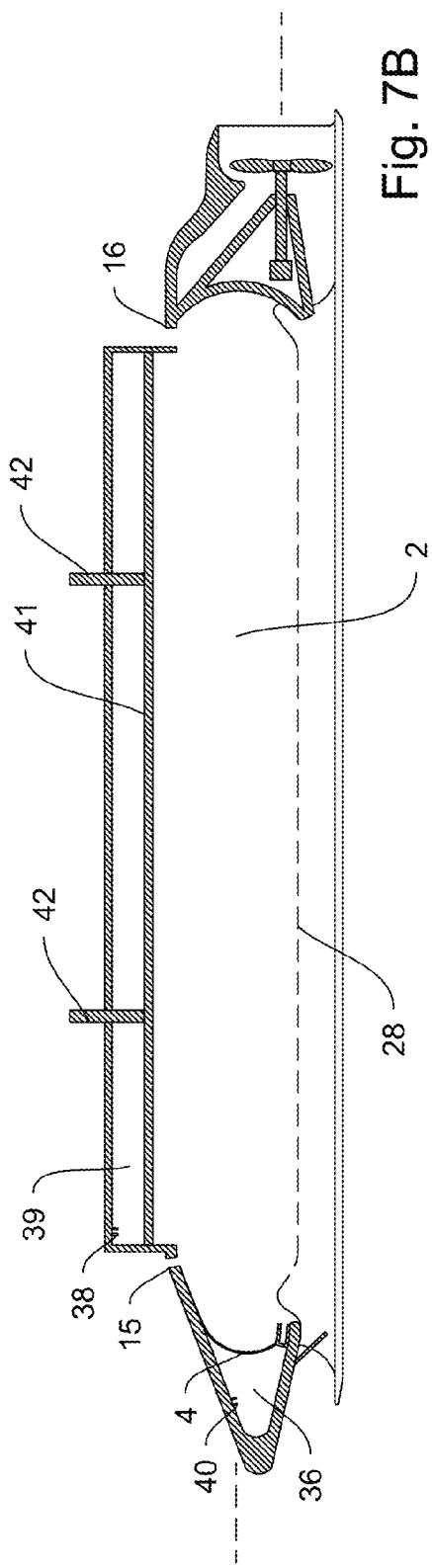
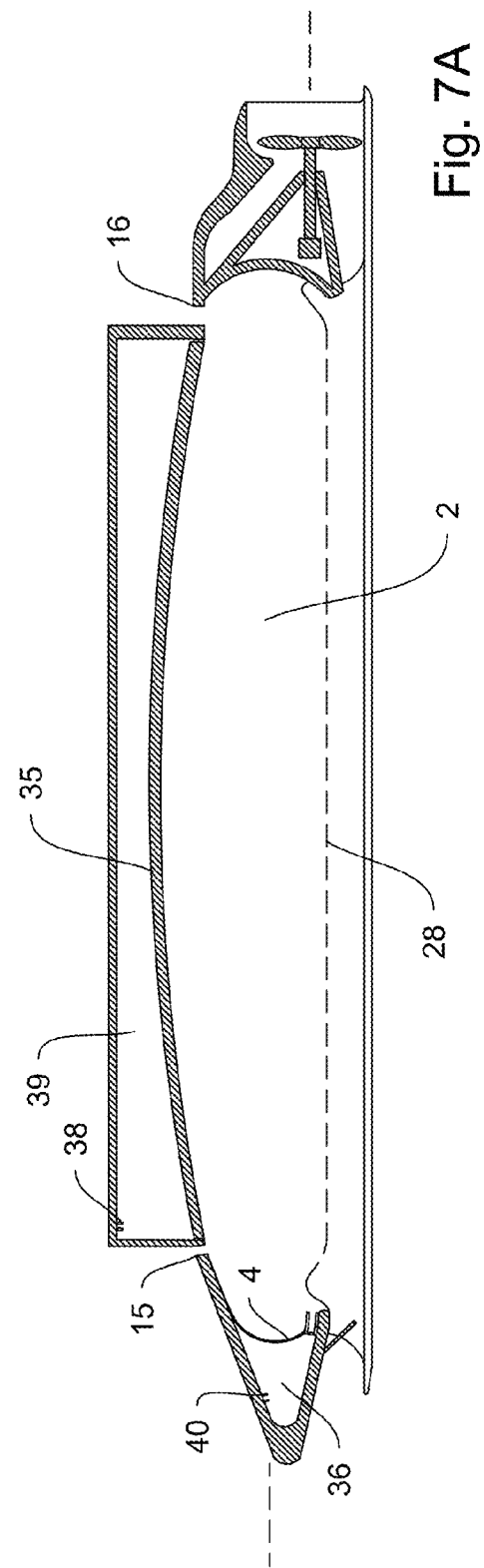

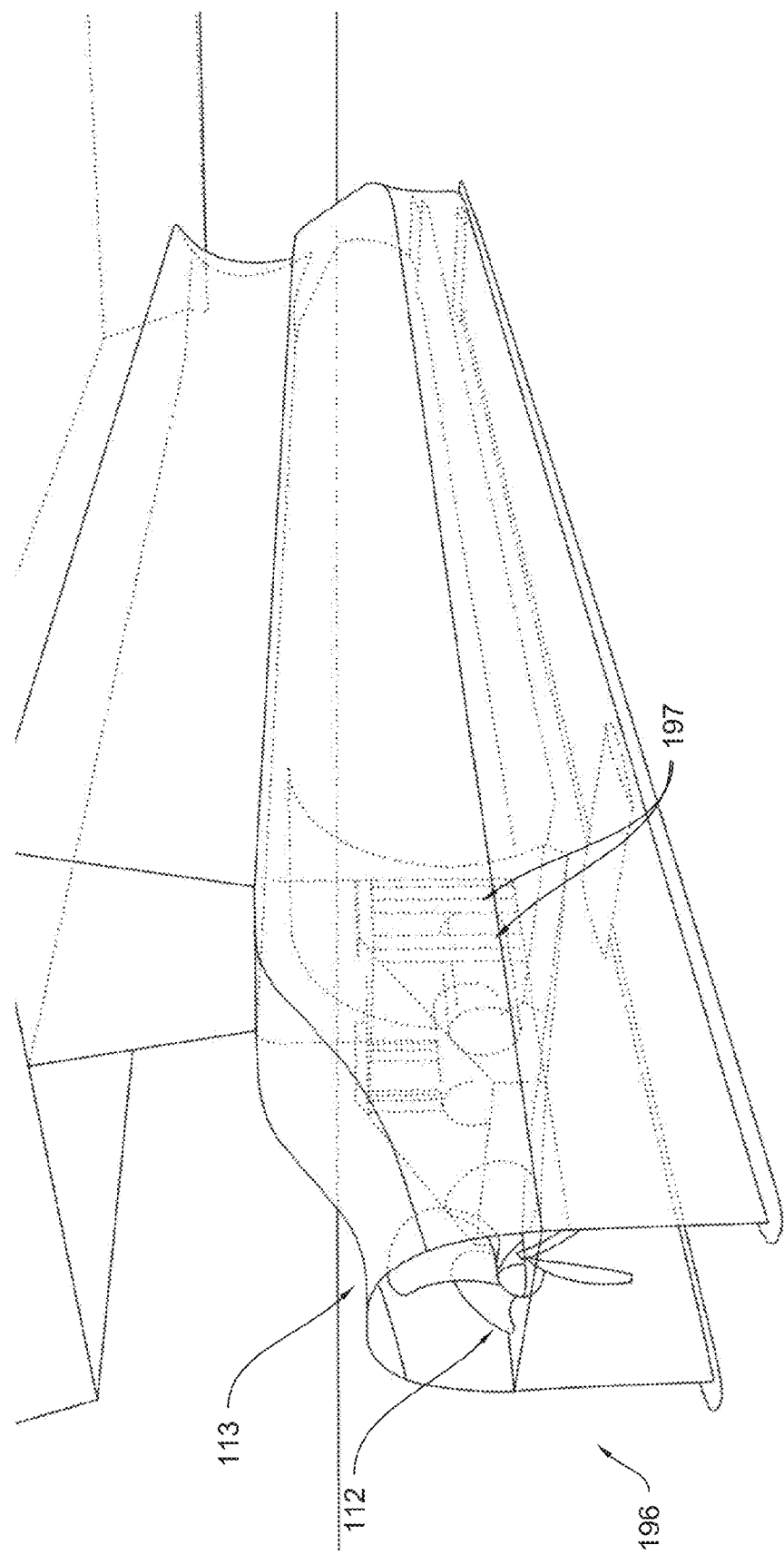

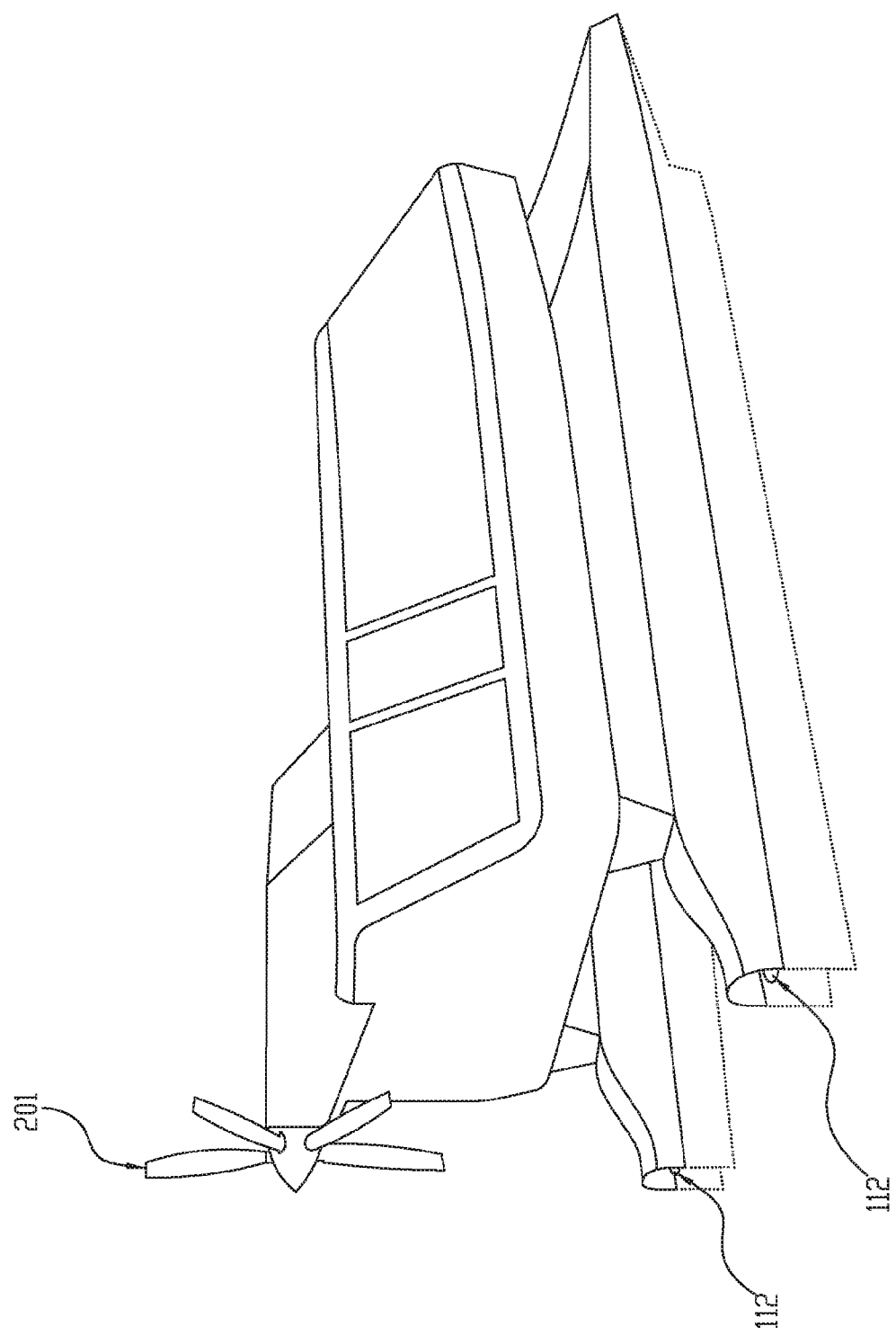

AIR CHAMBER HULL

TECHNICAL FIELD

The present invention relates to air-chamber boat hulls.

BACKGROUND

Water displacement and water friction of marine vessels accounts for some of the biggest costs and power uses required to drive a vessel through water. Various strategies to reduce water displacement have included planning surface areas and V-shaped hulls. One of the first improvements over displacement hulls is the design of planing hulls. Planing hulls work well for light weight crafts in smooth water or water with very small waves. Most planing hulls are designed to plane at cruising speeds. If the water waves are large the boat tends to bounce up and down and bang into oncoming large waves causing a very uncomfortable and unsafe riding condition. Planing hulls generally only work in lightweight high-speed boat designs used over fairly smooth water. Large cargo ships traveling in the open-ocean with large waves do not fit these criteria. By design, these strategies use large water-hull interface, which increases water friction on the vessel.

One strategy to reduce water friction has is to provide an air cavity under the hull, which reduces the hull-to water-contact area. Certain strategies have also been attempted to use air cavities to reduce water displacement such as hover crafts and surface effect ships. However, while thin air cavities have been successfully used to reduce water friction, the use of vessels having air cavities that provide a substantial reduction in water displacement has been met with many challenges, in-part due to the limited acceptable environments for vessel, namely calm and flat sea.

Air cavity hull technology has been in development for more than 50 years. In spite of its history, few implementations have been deemed practical and made into the marine vessel industry. Air cavity hulls add a layer of sophistication and complication as well as additional cost to boat construction. However a properly designed and built air cavity hull boat can add many advantages and cost saving. Innovations to boat hull design can reduce the water displacement.

The term air cavity has the nomenclature of a long shallow flat cavity at the bottom of a boat hull. In sea conditions that present waves, vessels with air cavities that substantially reduce water displacement (rather than merely configured for—friction reduction) often rapidly lose air, e.g. when wave undulation causes a portion of the hull become to airborne. Attempts to overcome this issue have included providing such vessels with retractable walls that give way to an oncoming wave and remain in contact with the water surface. Another strategy has been to provide non-retractable walls, using a step aft of the bow to form a recessed cavity, which tapers thinner to the stern to reduce the cross-sectional area and air volume at the stern to reduce air escape. Although these vessels may reduce instances of total air loss in very small waves, these instances of total air loss are traded for a more gradual loss of air from under the walls that skim across the water surface. Further, these air cavities offer negligible capacity for shock absorption and still experience rapid air loss in larger waves.

U.S. Pat. No. 7,143,710 (Lang et al.) describes a ship hull which includes air cavities, stabilizing fins and canard fins. The air cavities are very short and wide, configured to reduce drag from water friction. Lang et al. do not teach a deep air chamber (e.g. a high aspect ratio chamber) configured to reduce water displacement and provide shock absorption. Further Lang et al. do not teach fins extending from the side walls of an air cavity or air chamber such as inner fins or outer fins. Further, Lang et al. do not teach elongated fins. Further, Lang et al. do not teach a wave piercing bow. Further, Lang et al. do not teach a recirculating air chamber, U.S. Pat. No. 7,013,826 (Maloney et al.) describers an air chamber hull having retractable bow and stern air cushion seals that raise from the impact of water to maintain an air seal and comprising forward mounted foils. Among features, Maloney et al. do not teach a deep air chamber (e.g. a high aspect ratio chamber), stable fore and aft air chamber walls, elongated fins, fins extending laterally from the sidewalls, neutral fins, a recirculating air chamber, or a wave-piercing bow.

U.S. Pat. No. 6,199,496 (Burg) describes a gas cushion vessel having elongated knife shaped bows that slice into waves having an aft wall that tapers to reduce the cross sectional area at the stern. Among features, Burg does not teach a deep air chamber (e.g. a high aspect ratio chamber), a recirculating air chamber, or fins extending laterally from side walls.

U.S. Pat. No. 7,497,179 (Dize) describes a twin-hull catamaran comprising hydrodynamic lifting V-shaped hulls with mid-span recess that receives air. The recess tapers along the aft wall. Among features, Dize does not teach a deep air chamber (e.g. a high aspect ratio chamber), a recirculating air chamber, a wave-piercing bow, a non-planing hull, or fins extending laterally from side walls.

What is needed in the art is a deep air chamber hull that that provides substantial shock-absorption, depth stabilization, resistance to wave undulation, recirculation of air chamber air, wave-piercing capabilities to traverse large waves, and accommodation for surface propellers.

SUMMARY OF THE INVENTION

The invention provides a water craft hull having an air chamber defined by an upper wall, a fore wall, an aft wall, and sidewalls, wherein the sidewalls extend lower than the fore wall and the aft wall, and wherein the hull comprises at least one air injector configured to deliver pressurized air to the air chamber.

A hull of the invention can have one or more of the following features:
a. an air chamber with a stable fore wall, a stable aft wall, and stable sidewalls;
b. is a non-planing hull
c. a wave-piercing bow;
d. keel fins (e.g. inner keel fins and/or outer keel fins), e.g. keel fins having one or more of the following features: are neutral fins, are elongated fins, have an inner keel fins and an outer keel fins, wherein the outer keel fin has greater lateral extension than the inner keel fin;
e. an air chamber defined by substantially non-buoyant sidewalls e.g.:
   i. sidewalls have a width (thickness) of no greater than 20% of the width of the air chamber, and/or
   ii. sidewalls are configured to support less than 20%% of the hull mass or total water craft mass;
f. a high aspect ratio ('HAR') air-chamber, e.g. configured to provide an air cushion with substantial shock-absorption;
g. an air chamber configured for recirculating air flow;
h. a wave compensation system ('WCS')
i. has a surface propeller, j. an air chamber shaped like any of: an inverted U, an A shape, or an H shape.

The invention also provides a water craft comprising the hull. Optionally, the water craft comprise a plurality of the hulls, e.g. 2, 3, 4, or 5 hulls.

BRIEF DESCRIPTION OF THE DRAWINGS

FIG. 1A-1E depict views of a hull of the invention. FIG. 1A depicts a front top perspective view. FIG. 1B depicts a side view. FIG. 1C and FIG. 1D depict a bottom front perspective view and bottom rear perspective view respectively. FIG. 1E depicts a front view.

FIG. 2A depicts a front perspective view of a water craft comprising a hull of the invention and a deck 20. FIG. 2B depicts a rear perspective view of the water craft depicted in FIG. 2A.

FIG. 4A and FIG. 4B depict sectioned front views of hulls of the invention. Each section is made from a vertical plane that extends laterally through the hull. FIG. 4A depicts a hull with an H shaped air chamber. FIG. 4A depicts a hull with an A shaped air chamber.

FIG. 5A and FIG. 5B depict sectioned front views of hulls of the invention having lipped keel fins. Each section is made from a vertical plane that extends laterally through the hull. FIG. 5A depicts a hull having a keel fin with a vertical lip. FIG. 5A depicts a hull having an a tilted keel fin FIG. 6. depicts the top view of a two optional configurations for a water craft of the invention. The two configurations are provided in overlapping dashed lines representing the alternative decks.

FIG. 7A and FIG. 7B depict a hull of the invention comprising expandable air chamber walls.

FIG. 10B depicts a portion of a water craft having a hull of the invention sitting in water with an adjustable propeller at a lowered position.

FIG. 17A and FIG. 17B depict a water craft of the invention.

DETAILED DESCRIPTION OF THE INVENTION

Figure 1E:
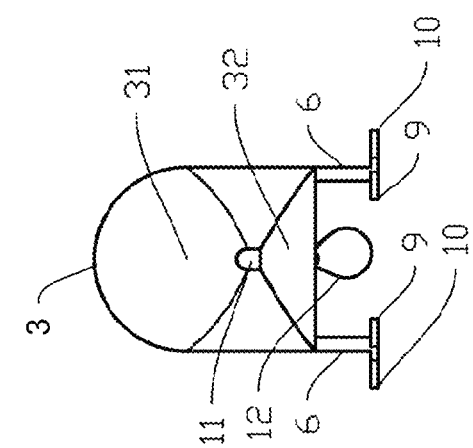
Figure 1D:
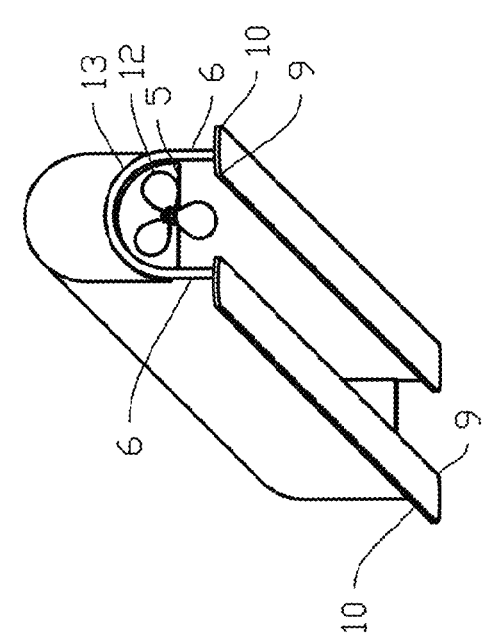
Figure 1C:
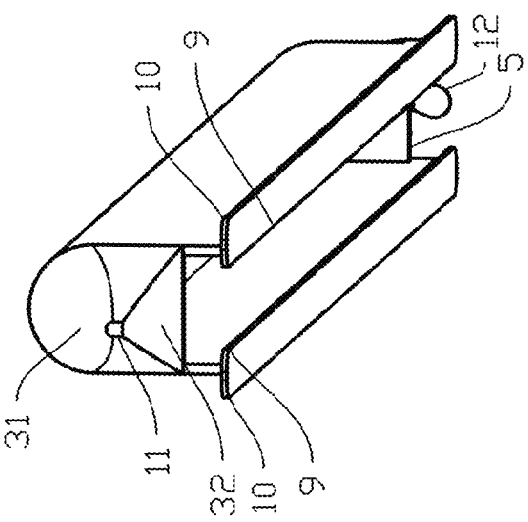
Figure 1B:
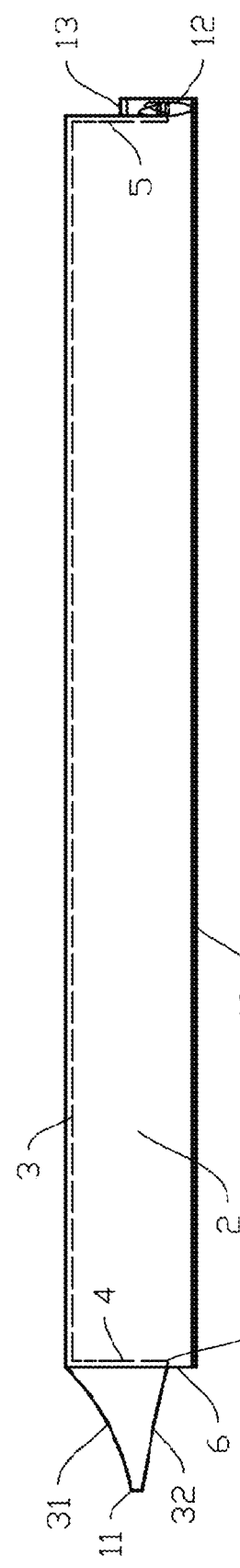

As used here, the following definitions and abbreviations apply.

"Exemplary" (or "e.g." or "by example" or "such as") means a non-limiting example.

"Adaptive wall" means an air chamber wall that retracts upon impact with water. Examples of adaptive walls include retractable walls such as curtains, hinged walls, or flexible seals that give way to an incoming wave. For example, an adaptive wall can be a hinged wall or a flexible seal that rises upon impact with a wave. As another example, an adaptive wall can be a hinged wall that is buoyant such that submerging the hull to a lower depth causes the wall to retract.

"Stable wall" means an air chamber wall that has a height that is does not retract upon impact with water. A stable wall can be any wall other than an adaptive wall. Optionally, a stable wall is a rigid wall, a non-hinged hinged wall, or a non-curtain wall that can be at least partially submerged and has a height that is not affected by impact with a wave. Optionally, an air chamber is defined by a wall (e.g. a fore wall) that has both an upper stable wall and a lower adaptive wall.

"Stable volume" means the air chamber volume enclosed by stable walls. The stable volume does not include any volume of air that can be lost due to retraction of an adaptive wall. Unless otherwise noted, the term "volume", as it relates to air chamber volume, means stable volume.

"Undulation" movement of a hull caused by a wave, e.g. pitch, roll, and/or heave caused by a wave.

Overview

The present invention provides novel hulls and water crafts comprising the hulls. Various hull features are taught herein and are useful independently or in concert for providing an improved hull. Accordingly, the invention contemplates embodiments comprising any feature taught herein as well as embodiments having any combination of features taught herein. For example, taught herein are useful air chambers, air chamber walls, keel fins, bows, sterns, propellers, and air chamber controllers that can be provided independently or collectively in any combination in a hull.

A hull of the invention comprises an air chamber defined by an upper wall, a fore wall, an aft wall, and sidewalls, wherein the sidewalls extend lower than the fore wall and the aft wall, and wherein the hull comprises at least one air discharge port ('air injector') configured to deliver pressurized air to the air chamber.

Optionally, the air chamber is a recirculating air chamber.

Optionally, the hull comprises keel fins.

Optionally, the air chamber has a high-aspect ratio ('HAR').

Optionally, the hull is a non-planing hull.

Optionally, the hull comprises a wave-piercing bow.

Optionally, the hull comprises a surface propeller.

Optionally, the hull comprises a system for compensating for wave effect. Optionally, the hull comprises an active system for compensating for wave effect. Additionally or alternatively, the hull optionally comprises a passive system for compensating for wave effect.

Optionally, the hull comprises an air-water interface on the outside of the hull, e.g. on the outside of the sidewalls.

Air Chamber

A hull of the invention comprises an air chamber. The air chamber can be any air chamber that provides buoyancy to the hull and has an open bottom. Accordingly, a useful air chamber is defined by (i.e. enclosed by) a fore wall, an aft wall, an upper wall, and sidewalls. The base of the air chamber is open when the hull is not in water and becomes enclosed by the water surface when the hull is placed in water. Such an air chamber is sometimes referred to herein as having an "open base". Among other advantages, the chamber reduces the contact area between the hull and the water, greatly reducing surface drag or water drag on the hull.

Figure 2C:
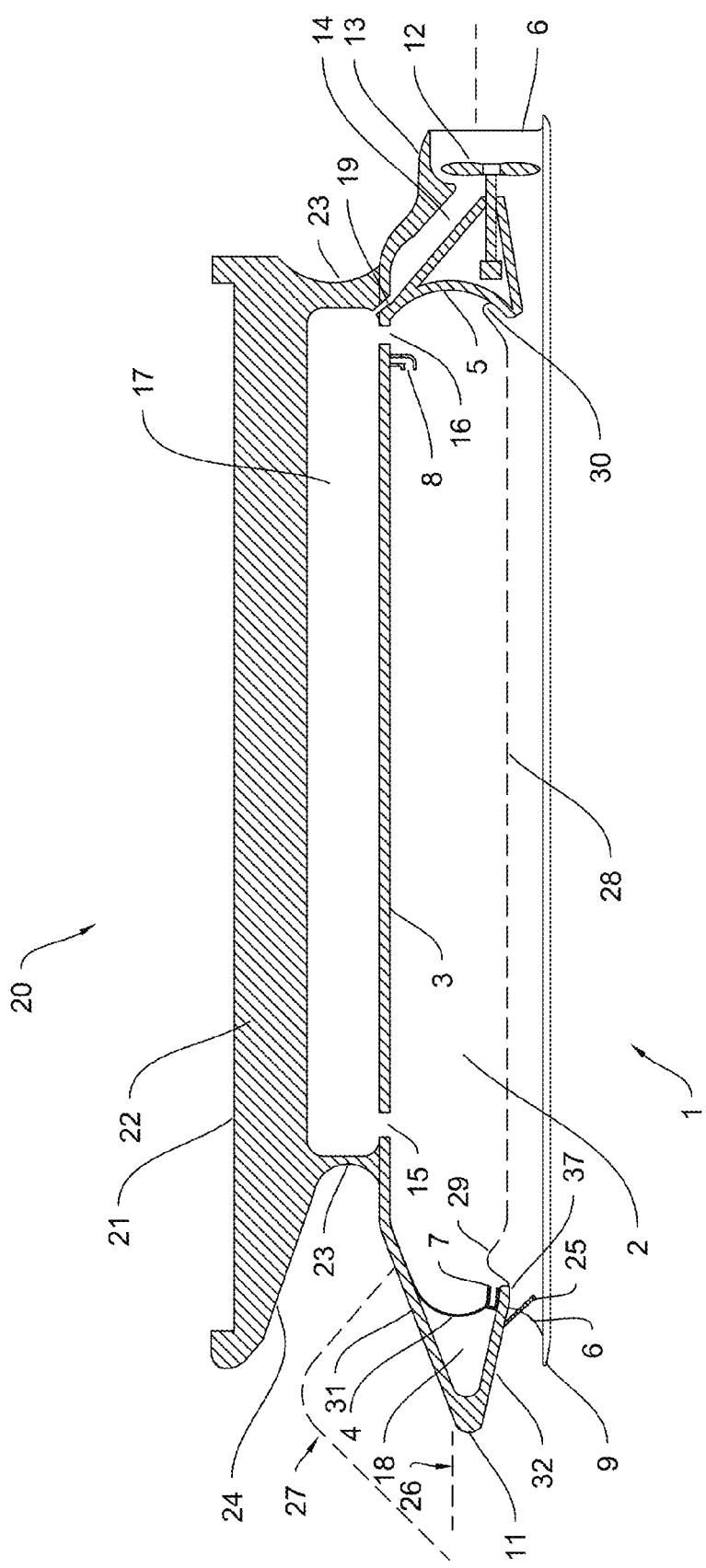
FIG. 2C depicts a sectioned side view of the water craft depicted in FIG. 2A and FIG. 2B. The section is made from a vertical plane that extends longitudinally down the centerline of the hull.

Optionally, air chamber is configured such a portion of the air chamber is above sea level and a portion of the air chamber is below sea level (e.g. as illustrated in FIG. 2C relative to sea level 26).

Optionally, the air chamber is at least partially enclosed by a flexible wall ('membrane'). The membrane can be, e.g. a flexible bladder (e.g. rubber bladder). Optionally, the membrane is constructed from a flaccid material or an elastic material. Optionally, the membrane is backed by a dampening chamber (e.g. a pressurized chamber or a fixed volume chamber). Optionally, one or more membranes are comprised by a fore wall, an aft wall, an upper wall, or a combination thereof. An air chamber having a membrane is useful to provide enhanced shock absorption, e.g. to the ability of the membrane to expand or move outward, momentarily increasing the air chamber volume due upon a sudden rise of the water line inside the air chamber.

Air Chamber Dimensions

An air chamber useful in the present invention can have any dimensions.

According to the present invention, the dimensions of air chamber are determined with respect to the stable volume that is filled with air when the air chamber is fully pressurized. In is condition, the base of the air chamber is flush with the level inside the air chamber, and extends from the base of a stable fore wall to the base of a stable aft wall. The other surfaces of the air chamber are defined (i.e. flush with) the side walls, fore wall, stern wall, and upper wall. The height of the air chamber is the vertical dimension of the air chamber (i.e. perpendicular to the water surface). The width of the air chamber is the lateral dimension (i.e. perpendicular to the forward direction of travel of the hull) taken horizontally (i.e. parallel to the water surface). The length of the air chamber is the longitudinal dimension (i.e. perpendicular to the lateral dimension).

Optionally, the air chamber has a height (e.g. mean height) of about 0.5 meters to about 15 meters, about 1 meter to about 10 meters, about 2 meters to about 7 meters, or about 3 meters to about 6 meters. Optionally, the air chamber has a mean height to mean width ratio of about 3:2 to about 3:1 (e.g. about 3:2 to about 2:1).

Optionally, the air chamber has a width (e.g. mean width) of about 0.3 meters to about 7.5 meters, about 0.7 meters to about 5 meters, about 1.3 meters to about 3.5 meters, or about 2 meters to about 3 meters. Optionally, the air chamber has a mean height to mean width ratio of about 3:2 to about 3:1 (e.g. about 3:2 to about 2:1).

Optionally, the air chamber has a high-aspect ratio ('HAR'). The HAR air chamber can be any air chamber having a height greater than the width. Optionally, HAR air chamber has a mean height greater than the mean width. Optionally, HAR air chamber has an absolute height (i.e. height of the tallest segment of the air chamber) greater than the absolute width (i.e. width of the widest segment of the air chamber). Optionally, the HAR air chamber has an absolute height to absolute width ratio of at least about 3:2, e.g. a ratio of from about 3:2 to about 4:1, from about 3:2 to about 3:1, or from about 3:2 to about 2:1. Optionally, the HAR air chamber has a mean height to mean width ratio of at least about 3:2, e.g. a ratio of from about 3:2 to about 4:1, from about 3:2 to about 3:1, or from about 3:2 to about 2:1. Optionally, the HAR air chamber has a lateral cross section (i.e. a cross section determined by a plane which is perpendicular to the longitudinal dimension) with an absolute cross-section height to absolute cross-section width ratio of at least about 3:2, e.g. a ratio of from about 3:2 to about 4:1, from about 3:2 to about 3:1, or from about 3:2 to about 2:1. Optionally, the HAR air chamber has a lateral cross section with a mean cross-section height to a mean cross-section width ratio of at least about 3:2, e.g. a ratio of from about 3:2 to about 4:1, from about 3:2 to about 3:1, or from about 3:2 to about 2:1. Such a HAR air chamber provides a shock-absorbing air cushion which experiences more gradual pressure increase upon a momentary rise in water level within the air chamber (e.g. due to a wave or a sudden depth change) and/or a more gradual increase in buoyant lifting force upon a momentary submergence of the hull to a lower depth. This is in contrast to a shallow air chamber that provides substantially less cushion, if any at all, due to a sharp increase in air pressure as the water level rises within the air chamber and/or a sharp increase in buoyant force upon submergence of the hull to a lower depth. Such a HAR air chamber also provides streamline hull that can reduce in depth (e.g. due to heave) without losing contact of the fore wall and aft wall with the outer water line to cause air scape. Such a HAR air chamber also allows the hull to remain stable with reduce hull heave as exterior waves ride up and down the tall side walls. Further, in the less likely event the base of the fore wall or aft wall loses contact with the water surface, the thin width of the HAR air chamber In a HAR air chamber would only allow a small amount of air to escape from under the fore wall or aft wall, rather than a drastic loss of air, as seen in short and wide air chambers of the prior art. Optionally, the air in the chamber is used (e.g. like a hydraulic jack) to raise the hull and reduce water displacement to a predesigned level, e.g. a short distance above the fore wall and the aft wall. The air in the chamber rises above the outside water level and it often extends below the outside water level. The air and water level inside the hull chamber remain relatively constant. The air fills the upper portion and then additional air under pressure is added to force the water level inside the chamber to a predesigned level a short distance above the fore and aft walls. This can occur, e.g. while the inner-chamber water level is kept constant. Further, water displacement can also be held constant and at a minimal amount.

Optionally, the air chamber is an elongated air chamber. The elongated air chamber can be any air chamber having a length:width ratio of at least about 5:1. Optionally, the elongated air chamber has a length:width ratio of at least about 7:1, at least about 10:1, at least about 15:1, about 10:1 to about 20:1, or about 15:1 to about 20:1. Optionally, the elongated air chamber has a ratio of the average length to average width of at least about 5:1. Optionally, the elongated air chamber has a ratio of the absolute length to the absolute width of at least about 5:1, e.g. at least about 7:1, at least about 10:1, at least about 15:1, about 10:1 to about 20:1, or about 15:1 to about 20:1. Optionally, the elongated air chamber has a longitudinal cross section (i.e. a cross section determined by a plane which is perpendicular to the lateral dimension) with a ratio of the absolute cross-section length to the absolute cross-section width of at least about 5:1, e.g. at least about 7:1, at least about 10:1, at least about 15:1, about 10:1 to about 20:1, or about 15:1 to about 20:1. Optionally, the elongated air chamber has a longitudinal cross section (i.e. a cross section determined by a plane which is perpendicular to the lateral dimension) with a ratio of the mean cross-section length to the mean cross-section width of at least about 5:1, e.g. at least about 7:1, at least about 10:1, at least about 15:1, about 10:1 to about 20:1, or about 15:1 to about 20:1. Optionally, the length is determined as the longest longitudinal length within the air chamber. Optionally, the width is determined as the longest lateral (i.e. horizontal) distance within the air chamber.

Optionally, the air chamber is an elongated, HAR air chamber. For example, the air chamber can have a height to width ratio of at least about 3:2 and a length to width ratio of at least about 7:1. Optionally, the air chamber has any HAR air chamber height to width ratio defined herein. Optionally, the air chamber has any elongated air chamber width ratio defined herein.

Air Chamber Shape

An air chamber useful in the present invention can have any shape. Optionally, the air chamber has an inverted U shape, an A shape, or an H shape.

Optionally, the air chamber has an inverted U shape. The inverted U shape can be any air chamber with a curved upper wall and which optionally has vertical sidewalls.

Optionally, the air chamber has an A shape. The A shape can be any air chamber with side walls that taper outward from the upper wall.

Optionally, the air chamber has an H shape. The H shape can be any air chamber with side walls that are substantially vertical.

Optionally, the air chamber has curved upper wall (e.g. a U shape), a substantially flat horizontal upper wall (e.g. an H shape or A shape with a flat horizontal upper wall), or a peaked upper wall (e.g. the upper wall can a very thin wall such as an edge formed by adjoining sidewalls of an A-shaped air chamber).

Air Chamber Volume

An air chamber useful in the present invention can have any volume.

Optionally, the air chamber has a volume of air that provides the majority (e.g. at least 70%) of the buoyancy provided by the hull. Sources of buoyancy other than the air chamber include, e.g. buoyancy provided by the displacement of hull components such as the hull walls.

Optionally, the air chamber has a volume of air that provides the majority (e.g. at least 60%) of the lift provided by the hull at cruising speed, e.g. a speed between 30 and 90 knots. Sources of lift at cruising speed other than the air chamber include, e.g. buoyancy provided by the displacement of hull components such as the hull walls and any optional hydrodynamic lifting surfaces (e.g. hydrofoils or planing surfaces) less than 20% of the lift. Optionally, less than 20% of the lift provided by hull is provided by hydrodynamic lifting forces when the hull is traveling at a speed of about 30 to about 90 knots (e.g. about 30 to about 50 knots). Optionally, less than 10% of the lift provided by the hull is provided by hydrodynamic lifting forces when the hull is traveling at a speed of about 10 to about 30 knots (e.g. about 15 to about 30 knots).

Optionally, the air chamber has a volume such that less than 50% of the buoyancy provided by the hull is provided by structures other than the air chamber (e.g. bow, stern, side walls, or keel fins). The total buoyancy of the hull is provided by the total displacement of water by the hull.

Air Injectors

A hull of the invention comprises one or more air injectors configure for delivering air to fill and pressurize the chamber.

Any source of forced air can be coupled to the air injectors. Optionally, the one or more air injectors supply forced air from an air source selected from a blower, a compressor, and a pressurized air tank.

Optionally, the hull comprises a controller configured for modulating the source of forced air. Optionally, the controller is a manual controller (i.e. controlled by a user), an automatic controller (e.g. a controller automatically controlled in response to one or more sensors and/or algorithms), or a digital controller (e.g. a computer-based controller). Optionally, the controller is configured for modulating the source of forced air flow to obtain a set air chamber pressure, e.g. a pressure set by a user, or set by one or more algorithms such as a wave-prediction algorithm or a hull depth algorithm). For example, a wave-prediction algorithm can be used to modulate (i.e. increase and/or decrease) air chamber pressure to compensate for wave undulation. As another example, a hull depth algorithm can be used to modulate air chamber pressure to achieve a desired hull depth or water displacement (e.g. to raise or submerge the hull in water).

Optionally, the one or more air injectors configured for a recirculating air chamber, as taught herein.

Optionally, the one or more upper air injectors comprise a plurality of laterally arranged air injectors or a laterally elongated air injector (e.g. spanning at least 50% of the air chamber width). For example, such air injectors can be positioned at the base of the air chamber and aimed to discharge astern and/or positioned at the upper portion (e.g. along the upper wall) of the air chamber and aimed to discharge air forward.

Recirculating Air Chamber

Optionally, the hull comprises a recirculating air chamber. The recirculating air chamber can be any air chamber that exhibits substantial circulatory air flow, i.e. air that flows astern in the air chamber, is redirected forward, and then is redirected astern again. Such a cycle of astern flow, forward redirection, and then astern redirection is referred to herein as an air cycle. Optionally, the air flows astern along a lower portion of the air chamber and flows forward along an upper portion of the air chamber. Optionally, air in a recirculating air chamber experiences a plurality of air cycles, e.g. before being lost under the lower edge of the aft wall.

A recirculating air chamber can be formed by providing one or more of the following features:

a. one or more air injectors that are positioned at a lower portion of the air chamber and aimed to discharge air astern along the inner water surface ('lower air injectors');

b. one or more air injectors that are positioned at an upper portion of the air chamber and aimed to discharge air forward along the upper wall ('upper air injectors');

c. a stable aft wall, e.g. configured to redirect air forward;

d. a stable fore wall, e.g. configured to redirect air astern;
e. a suction device configured to redirect air; and
f. a separator.

Optionally, the hull comprises one or more lower air injectors. The lower air injector can optionally be positioned anywhere on the lower half (e.g. the bottom ¼) of the air chamber and aimed to discharge air astern. Such an air injector can be used to create air flow that is directed astern along the lower portion of the air chamber (e.g. along the water line inside the air chamber). Optionally, the lower air injector is positioned at a height that is level with the lower edge of the fore wall or the water line inside air chamber. Optionally, the lower air injector is positioned in the forward half of the air chamber (e.g. at the fore wall). Optionally, the lower air injector is positioned in the lower, forward half of the air chamber (e.g. at the base of the fore wall such as aimed at a bow ripple wave). Optionally, the lower air injector is aimed to discharge air at a downward angle (e.g. an angle of 5° to 60° or 15° to 45° relative to the water line in the air chamber). Optionally, the one or more lower air injectors comprise a plurality of laterally arranged air injectors or a laterally elongated air injector (e.g. spanning at least 50% or at least 75% of the air chamber width).

Optionally, the hull comprises one or more upper air injectors. The upper air injector can optionally be positioned anywhere on the upper half (e.g. the upper ¼) of the air chamber and aimed to discharge air forward. Such an air injector can be used to create air flow that is directed forward along the upper portion of the air chamber (e.g. along the upper wall). Optionally, the upper air injector is positioned at a height at or near the upper wall. Optionally, the upper air injector is positioned in the rear half of the air chamber (e.g. at the aft wall). Optionally, the upper air injector is positioned in the upper, rear half of the air chamber (e.g. at the upper edge of the aft wall). Optionally, the upper air injector is aimed to discharge air at a substantially horizontal angle (e.g. an angle of less than 45° or less than 15° relative to the water line in the air chamber). Optionally, the one or more upper air injectors comprise a plurality of laterally arranged air injectors or a laterally elongated air injector (e.g. spanning at least 50% or at least 75% of the air chamber width).

Figure 2D:
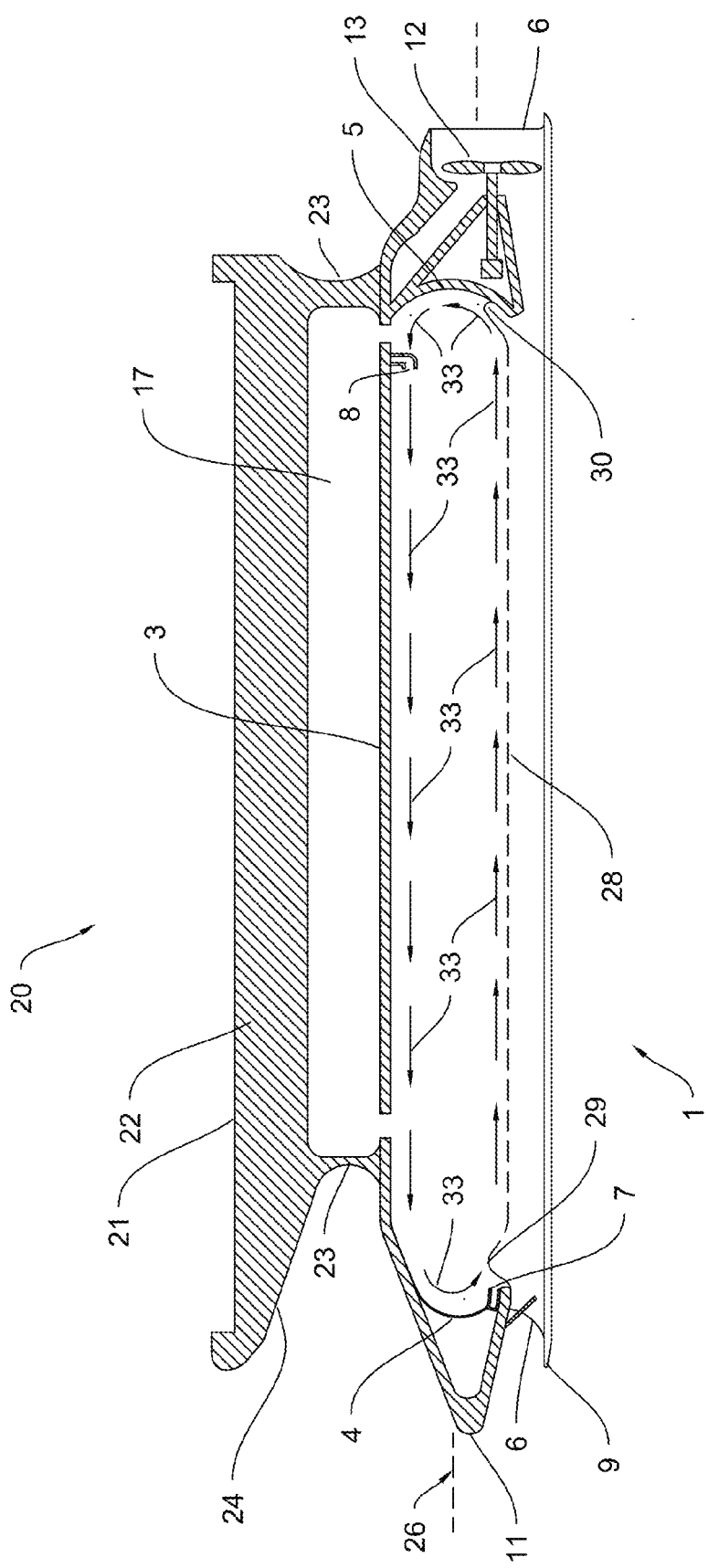
FIG. 2D shows the same view as FIG. 2C and additionally illustrates recirculating air flow.

Optionally, the hull comprises a stable aft wall and/or a stable fore wall that redirects incoming air (i.e. air traveling towards the wall) back toward the opposing wall of the air chamber (i.e. in the direction from which the incoming air came). One or both walls can have an incoming ramp (e.g. a ramp positioned at the level of incoming air) that redirects horizontally traveling incoming air vertically and/or a departing ramp that redirects vertically traveling air away from the wall. Optionally, one or both walls have a vertical portion that connects an incoming ramp and a departing ramp. Optionally, one or both walls have a curved portion, e.g. to redirects air. As one example, the aft wall and/or the fore wall can comprise a curve that provides an incoming ramp, a vertical portion, and a departing ramp. For example, the fore wall 4 and aft wall 5 depicted in FIG. 2D are each curved and have an incoming air ramp (the lower portion of the aft wall 5 and the upper portion of fore wall 4) and a departing air ramp (the lower portion of the fore wall 4 and the upper portion of aft wall 5). As depicted in FIG. 2D, each of the fore wall 4 and aft wall 5 optionally comprise a vertical portion configured to redirect air vertically (i.e. the middle portion on the curve or the imaginary curve tangent that is vertical).

Optionally, the recirculating air chamber suction device configured to create a low pressure zone to draw and redirect air towards the suction device. For example, a suction device can be positioned to create a low-pressure zone near the intersection of the upper wall and aft wall that causes air traveling astern along the inner water surface to be redirected upwards and optionally forward. Optionally, the suction device evacuates substantially less air than the one or more air injectors discharge.

Figure 3:
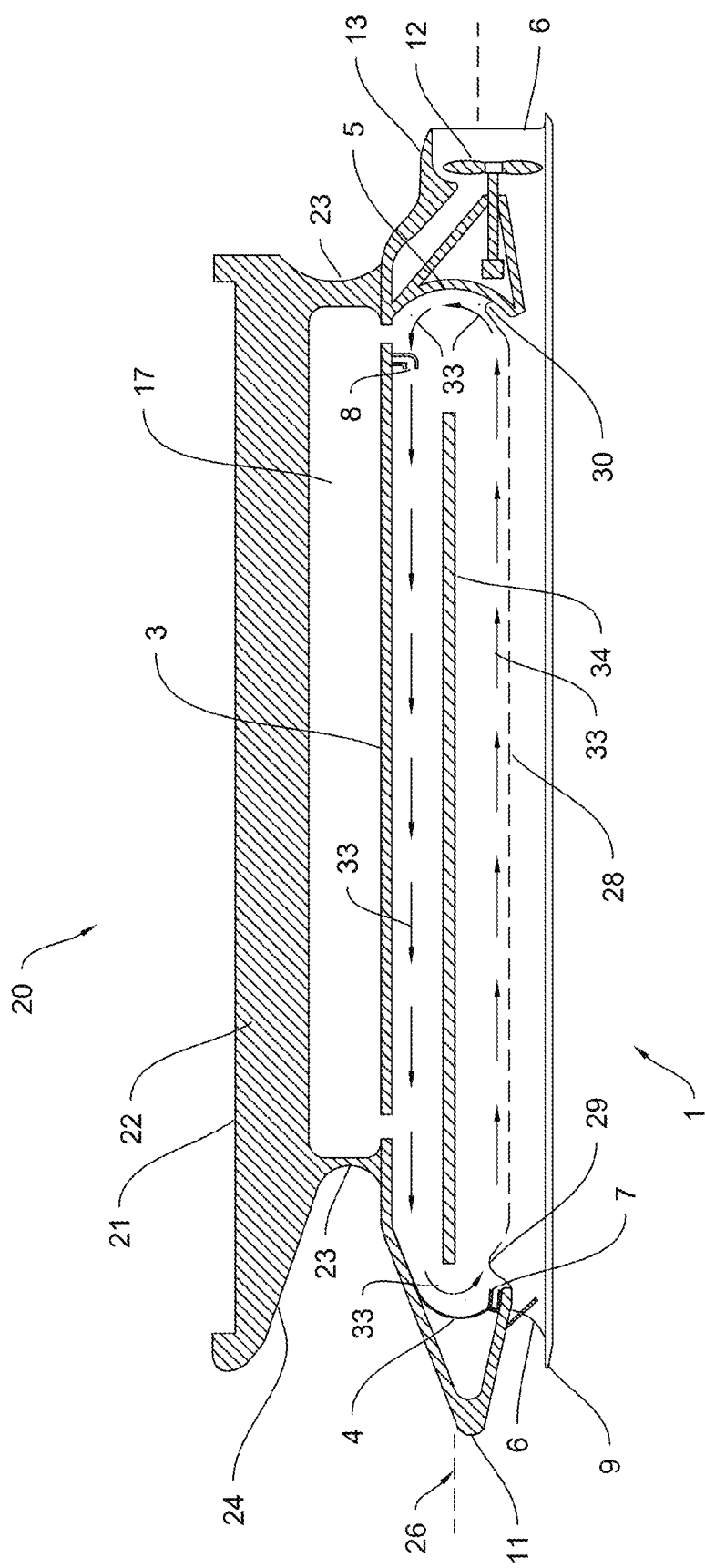
FIG. 3 depicts a sectioned side view of a water water craft comprising a hull of the invention. The section is made from a vertical plane that extends longitudinally down the centerline of the hull.

Optionally, the recirculating air chamber comprises a separator positioned between forward flowing air and rearward flowing air (e.g. separator 34 depicted in FIG. 3).

Without being bound by theory, the inventor believes that a recirculating air chamber provides one or more superior properties. For example, recirculation of air reduces air escape from the air chamber, thus reducing power needs for the air injectors. Additionally or alternatively, the inventor believes that recirculating air having air moving rearward at the water surface and air moving forward along the upper wall reduces drag and aids in forward hull movement (e.g. acting like a conveyor belt or caterpillar track as seen on tanks and snowmobiles) and, in certain embodiments, can even aid in shock absorption analogous to the flex and absorption imparted by a caterpillar track that helps dampen the effect of bumps to provide a smooth ride to tanks and snowmobiles.

Expandable Air Chamber Walls

Optionally, the air chamber is at least partially enclosed by an expandable wall. For example, the fore wall, aft wall, upper wall, or a combination thereof, can be expandable. An expandable wall is any wall that is configured to move to increase the volume of the air chamber.

Optionally, the expandable wall comprises a membrane (e.g. flexible bladder) or a piston.

Optionally, the hull comprises a dampening chamber on the side of the expandable wall opposite that of the air chamber. The dampening chamber is any chamber that is pressurized or configured to be pressurized (e.g. coupled to a source of forced air). Optionally, the hull optionally comprises a port through which air can be injected into and/or released from the dampening chamber. For example, the amount of air in dampening chamber can be controlled by injecting or releasing air through the port.

An expandable wall can be used, e.g. e.g. to provide a shock-absorbing air chamber. For example, an instantaneous rise in the water level inside the air chamber could be caused by certain scenarios such as a hull bounce, a sudden net down force experienced by the hull, any scenario in which the hull experiences or a sudden submergence. Without an expandable wall, the risen water level inside the air chamber would occupy a portion of the air chamber volume, and sharply compress the air in the air chamber causing a hard shock experienced the hull. However, an expandable air chamber wall can expand or move outward (e.g. into the dampening chamber) to compensate for the volume of air chamber instantaneously occupied by the risen water level, thus providing shock absorption.

Release Valves

Optionally, the hull comprises one or more pressure release valves or suction devices (collectively referred to herein as 'valves') configured to release air from the air chamber.

Optionally, the hull comprises a plurality of valves arranged longitudinally with respect to one other. Optionally, the valves are differentially controlled (e.g. one valve can be controlled independent of another). For example, the hull can comprise at least one valve that releases air from the forward half of the air chamber (e.g. near the fore wall) and at least one valve that releases air from the rear half of the air chamber (e.g. near the aft wall). As another example, the hull is optionally a multi-chamber hull comprising a first air chamber positioned forward of a second air chamber, wherein the hull comprises at least one valve that releases air from the first air chamber a and at least one valve that releases air from the second air chamber. Such configurations provide a hull that can differentially control longitudinally arranged valves to modulate pitch and/or to compensate for wave undulation.

Optionally, the one or more valves are controlled by a wave-compensation system.

Optionally, the hull is configured to release air from one or more valves as speed of the hull increases. For example, the hull can comprise a computer that controls the valves as a function of hull speed. As the hull craft speed increases the air pressure in the air chamber can optionally be reduced because of hydrodynamic lift on the hull provided by the hydrodynamic structures (e.g. hydrofoils, or lifting surfaces of the bow (e.g. tapered lower bow surface). Optionally, the reduced air pressure compliments and allows air in an air chamber configured for air circulation to flow with less restrictive pressure.

Fore Wall

A hull of the invention comprises a fore wall enclosing the front end of the air chamber.

Optionally, the fore wall comprises stable wall. A stable wall can be comprises, e.g. a rigid fore wall, a non-retractable fore wall, a flexible fore wall having fixed upper and lower edges and/or a fore wall protected from oncoming water by a rigid bow (e.g. fore wall 4 constructed as a membrane having fixed upper and lower edges which is also protected by the bow having upper bow surface 31, lower bow surface 32, and nose 11 as illustrated in FIG. 2C). Such a fore wall can stably extend below sea level without retracting from the impact water as the hull moves through the water with the fore wall extending below sea level, thus maintaining the effective air chamber height. Such a configuration provides a smoother, less bumpy ride, with enhance shock absorbing capabilities.

Optionally, the fore wall comprises an upper portion having a stable wall ('upper stable wall') and a lower portion having an adaptive wall ('lower adaptive wall'). For example, as illustrated in FIG. 2C, the hull can comprise an upper stable wall 4 or any non-retractable wall and a lower adaptive wall 25 such as a flap, hinged portion, or any retractable wall that is unprotected by the bow (i.e. is exposed to oncoming water and retracts upon impact of the oncoming water). Such a configuration combines the advantages of a stable wall and an adaptive wall, providing a smoother, less bumpy ride, with enhance shock absorbing capabilities provided by the stable fore wall along with a reduced propensity to lose air pressure suddenly if the lower edge of the stable wall rises out of the water or otherwise loses contact with the water, e.g. due to the ability of the adaptive wall to lower in height to remain in contact with the water surface and prevent or reduce air loss, thus maintaining a stable depth.

Optionally, the fore wall is configured for redirecting air flow within the air chamber, e.g. as described herein. For example, the fore wall can comprise a curve or one or more of an incoming ramp and a departing ramp configured to redirect incoming air (i.e. air moving forward towards the fore wall) astern.

Aft Wall

A hull of the invention comprises a wall enclosing the aft end of the air chamber ('aft wall').

Optionally, the aft wall comprises stable wall, e.g. a rigid aft wall or a flexible aft wall having fixed upper and lower edges. Such an aft wall can stably extend below sea level without retracting during movement of the hull, thus maintaining the effective air chamber height. Such a configuration provides a smoother, less bumpy ride, with enhance shock absorbing capabilities.

Optionally, the aft wall comprises an upper portion having a stable wall ('upper stable wall') and a lower portion having an adaptive wall ('lower adaptive wall'). Such a configuration provides combines the advantages of a stable wall and an adaptive wall, providing a smoother, less bumpy ride, with enhance shock absorbing capabilities provided by the stable aft wall along with a reduced propensity to suddenly lose air pressure suddenly if the lower edge of the stable wall rises out of the water or otherwise loses contact with the water, e.g. due to the ability of the adaptive wall to lower in height to remain in contact with the water surface.

Optionally, the aft wall is configured for redirecting air flow, e.g. as described herein. For example, the aft wall can comprise a curve or one or more of an incoming ramp and a departing ramp Upper Wall A hull of the invention comprises a wall enclosing the top of the air chamber ('upper wall').

Optionally, the upper wall comprises an expandable wall (e.g. a membrane such as a flexible bladder).

Optionally, the upper wall comprises a flat portion (e.g. as in an H-shaped hull).

Optionally, the upper wall comprises a curved portion (e.g. as in an inverted U shaped hull).

Sidewalls

A hull of the invention comprises side walls that laterally enclose the air chamber laterally. Optionally, the side walls extend lower than the air chamber.

Optionally, the side walls are rigid.

Optionally, the side walls are substantially vertical (e.g. as an H shape air chamber). Alternatively, the sidewalls are optionally tapered outward (e.g. as in an A shape air chamber).

Optionally, the side walls comprise a lip at their base, e.g. provided by an inner keel fin.

Optionally, the side walls extend lower than the air chamber (i.e. extend lower than the fore wall and aft wall, the bases of which define the base of the air chamber), wherein the mean height of the portion of the side walls that extends lower than the air chamber ('sub-air chamber side wall height') is at least about 10% of the mean height of the air chamber. Optionally, the sub-air chamber side wall height is at least about 20% of the mean air chamber height, at least about 30% of the mean air chamber height, about 10% to about 70% of the mean air chamber height, or about 20% to about 70% of the mean air chamber height. Among other advantages, side walls that extend lower than the air chamber can optionally be configured to position keel fins at a lower depth, e.g. a lower depth which provides increased loading on the outer keel fins from the weight of water (e.g. as a wave passes alongside the hull), e.g. to counter wave undulation. Further, such low-extending sidewalls provide a deep barrier to air escaping under the side walls in the event the fore wall or aft wall become airborne (e.g. due to severe wave undulation). In a HAR air chamber, such an airborne event would only cause a small amount of air to escape from under the fore wall or aft wall due to the thin width of the air chamber.

Optionally, the sidewalls are thin side walls, i.e. a sidewall having a width (thickness) of no greater than 20% of the width of the air chamber (e.g. a HAR air chamber).

Optionally, the sidewalls are configured to support less than 50% (e.g. less than 20%) of the hull mass or total water vessel mass. For example, the side walls can be configured to support less than 10% or less than 5% of the hull mass or the total water vessel mass. Such a configuration can be obtained, e.g. by providing thin side walls.

Fins

A hull of the invention optionally comprises one or more fins that extend laterally at a submerged depth (i.e. they are not surface skis). Optionally, the hull comprises fins extending laterally from the sidewalls at a location lower than the air chamber base ('keel fins'), e.g. keel fins extending from the base of the side walls. Optionally, the hull comprises fins that extend inward from the keel of the sidewalls ('inner keel fins'). Optionally, the hull comprises fins that extend outward from the keel of the sidewalls ('outer keel fins'). Optionally, the hull comprises elongated keel fins.

Optionally, a fin useful in the present is a neutral fin, e.g. an elongated keel fin. A neutral fin is a fin, wherein the majority of the fin does not provide hydrodynamic lifting forces (e.g. as contrasted with a foil). Optionally, at least about 80% or at least about 90% of the fin is non-lifting. Optionally, from about 0.5% to about 10% of the fin is hydrodynamic lifting. For example, the hull optionally comprises keel fins having a nose portion (e.g. the fore most 5%) that is tapered or slightly curved on the lower edge, thus providing a small amount of hydrodynamic lifting surface at the fin nose, and wherein the portion astern of the nose (e.g. the aft most 95%) does not provide a hydrodynamic lifting surface. Such neutral keel fins can be configured to provide little or no hydrodynamic lift, as contrasted with a foil. Additionally, such keel fins are configured to remain submerged while the hull cruises through the water, e.g. unlike a ski-type fin which is configured to plane at cruising speed. Accordingly, a neutral keel fin can be configured to lie substantially horizontal longitudinally such that movement through the water does not impart a substantial net lifting force on the keel fin (e.g. as contrasted with fins that provide a net hydrodynamic lifting force where the amount of net lifting force increase as the longitudinal length of the fin increases, such as a hydrofoil or an tilted fin). Such neutral keel fins provide stabilization (e.g. resistance to undulation and depth changes) without the problems associated with hydrodynamic fins such as hydrofoils, e.g. the tendency to impart varying amounts of lift depending on the length of the foil and the speed of travel through the water. Accordingly, neutral keel fins can be used in the hulls of the invention to impart stabilization without highly variable lifting forces and stabilize the hull depth to avoid undesirable surfacing and air loss from the air chamber.

A neutral keel fin can be designed to avoid a net up or down movement. Optionally, it is a very thin fin and has very little buoyancy and it provides very little or lift. Thus, a neutral keel fin has a neutral effect on the hull. However, the neutral keel fin can still exhibit resistance to depth changes while moving through the water and hence there can sometimes be lift or 'anti-sink' pressure under a neutral keel in response to a momentary down force on the hull (e.g. a hydrodynamic down force on a tapered bow upper surface experienced as a the bow pierces through a wave, or a down force caused by a sudden loss of air from the air chamber from under the fore wall or aft wall). Similarly, there can sometimes be a down-force or 'anti-lift' pressure on top of a neutral keel in response to a momentary lifting force on the hull (e.g. a momentary increase in buoyancy caused by displacement of the hull in a wave when the hull pierces through a wave. While the hull increases in speed traveling through water, there is an increase of the lifting and downforce pressures forming an equilibrium or near-equilibrium state on this keel fin that helps to hold it in a level state resistant to sudden depth change. By analogy, the hull is held in place similar to how a magnetic levitated monorail train is held on its track by the guides that wrap around the rail. Both the outer and inner fin optionally help to achieve the smooth ride like a monorail. The fins optionally behave in a manner analogous to the inner facing edge of a monorail, which keeps the monorail at a stable elevation. Thus, a neutral keel fin is a surprisingly useful as tool to maintain depth.

Optionally, the keel fins (e.g. neutral fins) are elongated fins, i.e. fins that span a greater longitudinal distance (i.e. length) than a lateral distance (i.e. width). Optionally, elongated fins having a length that is at least 10 times greater than the width (e.g. at least 15 times greater, at least 20 times greater, or at least 30 times greater). Optionally, the elongated keel fins span the majority of the air chamber (e.g. the entire length of the side wall). Alternatively, the elongated keel fins span the majority of the front quarter or front third of the air chamber and the majority of the rear quarter or rear third of the air chamber Such configurations provide longitudinal stabilizers that reduce unwanted pitch variations and heave (e.g. wave undulation). The advantages of having elongated keel fins over wide keel fins include, e.g. the capacity to spread the stabilizing action across the longer longitudinal length, about a majority of the hull length. For example, as a wave passes over a short outer fin or other force interacts with the fin, it exerts only a momentary and localized down force on the keel fin which has little effect on stabilization of the hull as a whole (e.g. depth stabilization). However, an elongated outer fin, as taught herein, has the capacity to interact with a wave as it passed over the entire length of the fin (e.g. the entire sidewall length), thus receiving a prolonged down force from wave water weight to counter the increased buoyancy caused displacement of the hull in the wave. Further, an elongated fin can optionally have a length that is longer than the wave length of typical waves through which the vessel is configured to travel, thus having the capacity to interact with a plurality of waves at once about different portions of the fin.

Optionally, the hull comprises an elongated fin (e.g. an inner keel fin, an outer keel fin, or both) that spans longitudinally a majority (e.g. the entirety) of the air chamber. Alternatively, the hull optionally comprises a plurality of inner keel fins, outer keel fins, or both, wherein at least one of said plurality of inner keel fins, outer keel fins, or a both is provided under each longitudinal half of the air chamber. Optionally, at least one of said plurality of inner keel fins, outer keel fins, or both is provided under each longitudinal third, each longitudinal quarter, or each longitudinal fifth of the air chamber.

Optionally, the hull comprises inner keel fins and outer keel fins (e.g. neutral fins), wherein the outer keel fins have a greater lateral extension than the inner keel fins.

Optionally, the hull comprises inner keel fins and outer keel fins (e.g. neutral fins), wherein the lower side of the inner keel fins and outer keel fins are continuous with each other. For example, the inner keel fins and outer keel fins can share a common flat bottom surface such that from the bottom the inner keel fin and the outer keel fin are the same member but on the top they are separated by the side wall.

Optionally, the keel fins are substantially non-buoyant. While substantially non-buoyant keel fins can exhibit small amounts of buoyancy, they are optionally not configured to support a majority of the hull water craft weight (e.g. as in a SWATH hull). Optionally, the non-buoyant keel fins have a wall thickness (e.g. the height of a horizontal fin) that is no greater than about 20% or no greater than about 10% relative to the mean width of the air chamber. Optionally, the keel fins have a wall thickness that is less than the wall thickness (i.e. width) of the side walls.

Optionally, keel fin extends forward from the front end of the side wall. Optionally, the upper surface of the nose (i.e. front most portion) of the keel fin is substantially horizontal, e.g. does not have a substantial upward curve (e.g. as seen on water ski) that keeps the bow of the keel fin angled upward. Optionally, the keel fin nose is tapered (e.g. to a point) along a vertical axis and/or a horizontal (i.e. lateral) axis (e.g. as in a bullet point). Optionally, the keel fin nose is wedge, e.g. pointed or blade-like to cut through the water (e.g. has an upper surface and/or lower surface that is tapered vertically to a wedge). Such a keel fin can optionally provide a small amount of hydrodynamic lifting force at the nose of the keel fin nose, while still providing a substantially neutral keel fin overall. Optionally, the keel fin nose is tapered laterally, e.g. rounded to point at the front center (e.g. like a spade or shovel).

Optionally, the hull comprises one or more keel fins on each side wall (e.g. an inner fin and/or an outer fin), wherein the collective width of the one or more keel fins on each side wall is about 40% to about 100% of the width of the air chamber width.

Optionally, the hull comprises an inner fin (e.g. inner keel fins) and an outer fin (e.g. outer keel fin) on each side wall, wherein the mean width of the inner in is less than the mean width of the outer fin. Optionally, the ratio of the mean inner fin width to the mean outer fin width is about 1:2 to about 1:4.

Optionally, the hull comprise an inner keel fin and an outer keel fin, wherein the inner keel fin and the outer keel fin share a common lower surface (i.e. the lower surface of the inner keel in is continuous with the lower surface of the outer keel fin). Such a configuration provides a larger continuous lower surface area for depth stabilization and/or a surface capable of supporting the hull if the hull runs ashore or impact a submerged object or sea floor.

Optionally keel fins extend forward and/or astern of the air chamber.

Inner Fins

Optionally, a hull of the invention comprises fins that extend inward from the side walls ('inner fins'). Optionally, the inner fins are inner keel fins.

Optionally, the inner fins (e.g. inner keel fins) are elongated fins. Optionally, the elongated inner fins span the majority of the air chamber (e.g. the entire length of the side wall). Alternatively, the elongated inner fins optionally span the majority of the front quarter or front third of the air chamber and the majority of the rear quarter or rear third of the air chamber Optionally, the inner fins (e.g. inner keel fins) are neutral fins.

Optionally, the inner fins (e.g. inner keel fins) are non-buoyant fins. Optionally, the non-buoyant inner fins have a wall thickness (e.g. the height of a horizontal fin) that is no greater than about 20% or no greater than about 10% relative to the mean width of the air chamber. Optionally, the inner fins have a wall thickness that is less than the wall thickness (e.g. width) of the side walls.

Optionally, the hull comprises one or more inner fins (e.g. keel fins) on each side wall, wherein the mean width of the one or more keel fins on each side wall is 10% to 20% of the width of the mean air chamber width.

Inner fins such as inner keel fins provide one or more superior properties. For example, the inner fins can provide an inner lip under the water that encloses the base of the air chamber, thus restricting water between the sidewalls from moving up and down, restricting the air enclosed by the water from escaping from the air chamber, and imparting more efficient pressurization of the air chamber. Further, the inner fin can optionally oppose and/or receive a downward force of water located between the side walls, e.g. water forced downward by the pressurized air chamber or water directed downward by a tapered lower bow surface and/or water directed downward as it passes under a stable fore wall, thus aiding in depth stabilization and/or resistance to upward motion (e.g. resistance to heave as a hull pierces through a wave). Further, the inner keel fin optionally adds to the width and stabilizing effect of the outer keel fin and balances with the outer loads on the outer keel fin surface, for example, by providing an inner fin that receives a vertical force (e.g. an inner fin with less lateral extension relative to the outer keel fin, but which experiences greater pressure on its surface area is due to high air pressure inside the chamber) and reduces the lateral torque on the side walls that would otherwise be imparted by an up down force on the outer keel fin. Further, the inner fin optionally adds to the overall width of the total fin lower surface (e.g. in a configuration in which the inner keel fin and outer keel fin have a continuous lower surface), in which the lower surface adds dynamic equilibrium above and below to help restrict movement and cause a smooth travel through the water.

Outer Fins

Optionally, a hull of the invention comprises fins that extend inward from the side walls ('outer fins'). Optionally, the outer fins are outer keel fins.

Optionally, the outer fins (e.g. outer keel fins) are elongated fins. Optionally, the elongated outer fins span the majority of the air chamber (e.g. the entire length of the side wall). Alternatively, the elongated outer fins optionally span the majority of the front quarter or front third of the air chamber and the majority of the rear quarter or rear third of the air chamber Optionally, the outer fins (e.g. outer keel fins) are neutral fins.

Optionally, the outer fins (e.g. outer keel fins) are non-buoyant fins. Optionally, the non-buoyant outer fins have a wall thickness (e.g. the height of a horizontal fin) that is no greater than about 20% or no greater than about 10% relative to the mean width of the air chamber. Optionally, the outer fins have a wall thickness that is less than the wall thickness (e.g. width) of the side walls.

Optionally, the hull comprises one or more outer fins (e.g. keel fins) on each side wall, wherein the mean width of the one or more outer fins on each side wall is 15 to 40% of the width of the mean air chamber width.

Optionally, the outer fins are lipped fins. For example the fins can comprise a vertical lip (e.g. a horizontal fin 10.1 with a vertical lip 10.2 as depicted in FIG. 5A) or a tilted lip (e.g. provided by a tilted fin 10.3, as depicted in FIG. 5B). Such a lipped fin can provide, e.g. an increased capacity to retain a wave load (i.e. downward force). For example, a front wave that is pierced through and runs along the side wall or a cross wave that impacts the sidewall would impart a downforce on the outer keel but a portion of the wave load would be lost as it slips off a non-lipped outer keel fin.

However, a lipped keel fin is able to retain a substantially greater amount of the wave load, e.g. by preventing the wave load from slipping off the outer edge of the outer keel fin.

Outer keel fins provide one or more of the following support properties. The outer keel fin can receive a load (downforce) from a wave as it passes over the fin. This downforce can counter the upward heave that is typically experienced from a wave. For example, as the bow optionally nose pierces through a wave, the water level rises on the outside of the side walls and loads more water weight pressure on the outer keel fins. This added load counters the lifting push effect of the rising wave action. In addition, the outer keel fin can counter cross or angle waves that hit into the sides of the hull. The fin is loaded with extra water to counter wave lift/push action.

Foils

Optionally, a hull of the invention comprises one or more foils that provide a hydrodynamic lifting force.

Optionally, the hull comprises a foil under the air chamber, e.g. positioned between the side walls under the front half (e.g. front quarter or fore wall) of the air chamber. Optionally, the foil is configured as a cross brace between side walls. Such a foil positioned under the air chamber optionally add a small amount of lifting force to the bow and optionally aids enhances the efficiency of air chamber pressurization.

Optionally, the one or more foils are to keep the air chamber submerged, i.e. they are not configured to raise the air chamber out of the water such that air rapidly escapes from under the base of the fore wall and/or aft wall.

Optionally, the one or more foils are configured to impart a hydrodynamic lifting force that is less than 30% (e.g. less than 20% or less than 10%) of the total lifting force provided by the hull. For example, the majority of lifting force is provided by the air chamber.

Bow

A hull of the invention comprises a bow, i.e. the forward portion of the hull. Optionally, the hull comprise a bow that extends forward of the air chamber fore wall. Optionally, the bow is a wave-piercing bow.

Optionally, the bow is a-piercing bow. The wave-piercing bow can be any bow configured to pierce through a wave rather than be pushed up to pass over a wave. Examples of wave piercing bows are known in the art. Optionally, the bow is configured to impart a down force travel through a wave. This can be achieved, e.g. by providing a bow that tapers upward astern along a portion of the upper surface of the bow that is contacted with water as the bow enters a wave. Optionally, such a bow is combined with a nose positioned near the water surface or under water, e.g. either positioned at a height that is below sea level in flat sea (e.g. just below sea level) or positioned at a height that is above sea level in flat sea (e.g. just above sea level) but pierces through a wave. Optionally, the nose is positioned at a height that is below the upper wall (i.e. below the top of the air chamber) and above the base of the fore wall (i.e. above the base of the air chamber). Optionally, the sides of the bow (i.e. lateral sides) are tapered outward from the nose astern.

Optionally, the bow has an upper surface that tapers upward from fore to aft and lateral sides that taper outward from fore to aft. Optionally, the bow has a lower surface that tapers downward from fore to aft, e.g. at an angle relative to horizontal that is less than that of the taper of the upper surface of the bow. Optionally, the bow has a lower surface that is concaved laterally (e.g. as in an inverted U). Optionally, the nose of the bow is positioned at a level that is between the base of the air chamber and the upper wall of the air chamber. Optionally, the nose of the bow is positioned at a level that is in the lower half of the air chamber (i.e. closer to the level of the base of the air chamber than the upper wall) or the lower third of the air chamber.

Optionally, the bow comprises a lower surface that connects (e.g. is continuous with) the nose and the base of the fore wall Optionally, the bow has a bottle nose shape, i.e. having an upper surface that tapers upward aster, a lower surface that tapers downward astern, and lateral sides that taper outward astern. Optionally, one or more of the tapers are curved tapers (i.e. the surfaces are concave surfaces).

Optionally, the bow has a cushioned nose (e.g. a rubber bumper)

Optionally, the nose has is configured with one or more of the following technical features:
a. nose height is in close proximity to (e.g. just below) sea level;
b. has a nose that is substantially lower than the upper wall;
c. nose height is in close proximity to (e.g. just above) lower edge of fore wall and/or aft wall;
d. nose height is closer in proximity to base of fore wall than upper wall (e.g. to provide a sharper angle of taper on the upper surface than on the lower surface such that the bow receives a net down force when submerged and traveling horizontally).

Stern

A hull of the invention comprises a stern, i.e. the rear portion of the hull. Optionally, the hull comprise a stern that extends rearward of the air chamber stern wall.

Optionally, the stern comprises a propulsion mechanism (e.g. a propeller).

Optionally, the stern comprises a propeller shroud.

Optionally, the stern comprises a vented air duct positioned forward of the propeller, wherein the duct is configured to supply air (e.g. forced air) to the propeller (e.g. upper portion of a surface propeller). For example, the duct can be coupled to a source of forced air, such as a blower, an air tank, or pressure release valves of the air chamber.

Optionally side fins and/or keels extend aft of the aft wall, e.g. to provide side and lower shroud, respectively, to a propeller optionally placed between the side wall extension.

Non-Planing Hull

A hull of the invention is optionally a non-planing hull.

Planing hulls are configured to raise the hull up out of the water and skim across the water surface. Planing hulls comprises one or more hydrodynamic lifting members such as planing surfaces or foils that cause the hull to rise up at cruising speed and skim across the water. While certain embodiments of a non-planing hull of the invention can optionally comprise planing surfaces, foils, or other hydrodynamic lifting members that provide, e.g. a small amount (e.g. at the bow), they do not provide substantial lift that cause the hull to raise out of the water and skim across the water at a cruising speed (e.g. about 30 to about 90 knots or about 30 to about 50 knots). For example, a non-planing hull of the invention optionally provides advantages such as: ability to traverse large waves, wave-piercing ability, reduced wave undulation, better shock absorption capacity, and reduced loss of air from the air chamber that would otherwise be cause by skimming across the water.

Multi-Chamber Hull

Optionally, a hull of the invention is a multi-chamber hull. According to the present invention, a multi-chamber hull is any comprising a plurality of air chambers arranged longitudinally relative to another. Each air chamber comprises a fore wall, an aft wall, an upper wall, and air injectors. Optionally, each chamber comprises one or more of the technical features of air chambers taught herein.

Optionally, a multi-chamber hull comprises a first air chamber and a second air chamber, wherein the aft wall of the first chamber is forward of the fore wall of the second chamber. Optionally, at least a portion of the side walls of the first and second air chambers are substantially aligned with each other. For example, the multi-chamber hull can be obtained by providing an air chamber, providing a lateral wall that divides the air chamber into a fore chamber and an after chamber, and providing air injectors in both the fore chamber and the aft chamber. In this example, the aft wall of the fore chamber is optionally provided by the front face of the lateral divider and the fore wall of the aft chamber is optionally provided by the rear wall of the lateral divider.

Optionally, the hull is configured for differentially controlling the air pressure of the respective air chambers, e.g. by differentially controlling air injectors in each chamber, valves in each chamber, and/or expandable walls in each air chamber.

Optionally, the hull is configured for differentially controlling the air injectors of the respective air chambers. For example, the air injectors of each hull are optionally coupled to a different source of forced air.

Wave Compensation System

Optionally, a hull of the invention comprises a wave compensation system ('WCS'). The WCS is any system that modulates lifting forces (e.g. air chamber pressure) to reduce wave undulation (e.g. heave, pitch, and/or roll).

Optionally WCS comprises at least one sensor configured to detect one or more wave features or wave effects and a controller (e.g. analog controller or computer-based controller) configured receive sensed signals or data from the sensor and control one or more components that modulate lifting forces of the hull.

Optionally, the one or more components that modulate lifting forces of the hull are components that modulate displacement (e.g. air injectors and/or air chamber valves), hydrodynamic forces (e.g. hydrofoil angle), or a combination thereof. For example, air injectors and valves can be controlled by restricting or increasing air flow.

Optionally, the at least one sensor comprises a sensor of a wave features, e.g. a radar system, a microwave system, and/or a laser system. Examples of such sensors are known in the art. Optionally, the one more wave features are features of a wave that useful to predict effect on hull undulation, e.g. wave amplitude, wave speed, wave direction, or wave frequency (or wave period). Examples of used wave feature sensor systems are described by U.S. Pat. No. 6,775,617 and WO 2011/028637, which are hereby incorporated by reference. Optionally, the WCS relates radar echo intensity imagery of waves to wave height using modulation transfer function to scale echo intensity to wave height, e.g. as described by U.S. Pat. No. 6,775,617. Optionally, the WCS receives IF radar ocean surface echo signal, and determines one or more of wave height directional spectra, frequency spectra, and wave height, e.g. as described by WO 2011/028637.

Optionally, the at least one sensor comprises a sensor of one more wave effects such as air chamber pressure (e.g. absolute air chamber pressure, change in air chamber pressure, or rate of change in air chamber pressure) or hull undulation (e.g. pitch, roll, or heave) and a controller. For example, U.S. Pat. No. 5,273,127 describes a useful sensor and controller, which is hereby incorporated by reference. Optionally, the controller takes the first derivative of the pressure signal by use of a differentiator circuit and uses the output of the differentiator circuit or any signal that is proportional to the rate of change of pressure in the supporting air cushion, as a signal to base control of valves or air injectors (e.g. positioning of the vanes that control flow from valves or flow to air injectors). Guidance for providing such a controller can be found in U.S. Pat. No. 5,273,127.

A WCS provides or more of the following superior properties. Optionally, the WCS allows the hull to maintain a specified depth, reduce shock or bounce caused by a wave, and/or reduced undulation such as heave, pitch, or roll. Optionally, the WCS allows the hull to enter a wave with a wave-compensating orientation, e.g. having a specified depth and/or attitude. Optionally, the WCS reduces or prevents the hull from becoming airborne such that air chamber pressure is rapidly lost from under the fore wall and/or aft wall. Optionally, the WCS provides wave compensation for encountering a plurality of oncoming waves (e.g. a set of waves that follow each other).

Propulsion

A hull of the invention optionally comprises a propulsion mechanism.

The propulsion mechanism can be any mechanism configured to cause movement of the hull through the water. Optionally, the propulsion mechanism is configured to modulate the speed of the hull.

Optionally, the propulsion mechanism is a propeller, a jet propulsion mechanism (e.g. an impeller), a paddle wheel, an air propulsion mechanism (e.g. fan, turbine, a turbo prop, or jet engine), or a wind propulsion mechanism (e.g. sail or air foils).

Optionally, the propulsion mechanism is a propeller. Optionally, the propeller is a surface propeller. Optionally, the hull comprises a surface propeller shroud. Optionally, the hull comprises a duct configured to supply air (e.g. vent air) to the surface propeller, e.g. to supply air to the upper portion of the propeller. Guidance for supplying air to a propeller can be found in, e.g. U.S. Pat. No. 4,689,026, and U.S. Pat. No. 6,193,573, which are hereby incorporated by reference.

Optionally, a hull of the invention provides one or more superior properties when combined with a surface propeller. For example, a dense layer of water proceeds out from under the base of the aft air chamber wall, which provides the optimum dense water to allow the surface prop to have maximum torque to propel the hull. Further, in embodiments comprising a duct for supplying air to the propeller's upper portion (i.e. the unsubmerged portion), air can be vented to blow out or clear excess water spray from affecting the prop rotation. This advantage is optionally enhanced in a hull comprising a propeller shroud.

Optionally, the propulsion mechanism is a propeller comprises an electric motor. Optionally, the electric motor is a high temperature super conductive (HTS) motor, e.g. comprising bismuth Strontium Calcium Copper Oxide (BSCCO) coils. HTS motor technology has been used, e.g. by DOOSAN (Kwon et al. Power Engineering Society General Meeting, 2006. IEEE), KERI & DOOSON (http://resource-center.ieee-pes.org/files/2014/02/PESGM2006P-001340.pdf), Sumimoto Electric (http://indico.cern.ch/event/308828/session/2/contribution/9/material/slides/1.pdf) and in U.S. Navy Zumwalt watercraft. Other examples of useful examples HTS technology are known the electric motor arts.

Air-Coating

A hull of the invention optionally a structure configured for coating outer walls (e.g. the outside of the sidewalls)

with air ('air coating structure'). Optionally, the hull comprises a mechanism to supply air to the outside of the side walls, i.e. to use air as a separator between the outside of the side walls and the sea water.

Optionally, the air coating structure is a micro-bubble coating, an air-film coating, or a side air cavity. Examples of useful micro-bubble technology is described by US 2014/0030118, U.S. Pat. No. 5,575,232, WO/2005/122676, and U.S. Pat. No. 7,997,221, which are hereby incorporated by reference. Examples of useful side air cavity technology are described in by U.S. Pat. No. 7,143,710 which is hereby incorporated by reference. Examples of useful air-film coating technology are described in by U.S. Pat. No. 4,031,841 which is hereby incorporated by reference.

Optionally, the hull comprises a micro bubble producer such as air discharge ports configured to produce microbubbles on the outer surface of the side walls. For example, the hull optionally, comprises air discharge ports positioned about the base on the outside of the side walls or about the upper surface of outer keel fins.

Optionally, the hull comprises air discharge ports configured to produce microbubbles on the lower surface of keel fins. For example, the hull optionally, comprises air discharge ports positioned about the lower surface of the keel fins.

Water Vessel

One aspect of the invention provides a water vessel having a hull of the invention, and optionally comprising a deck.

Figure 6:
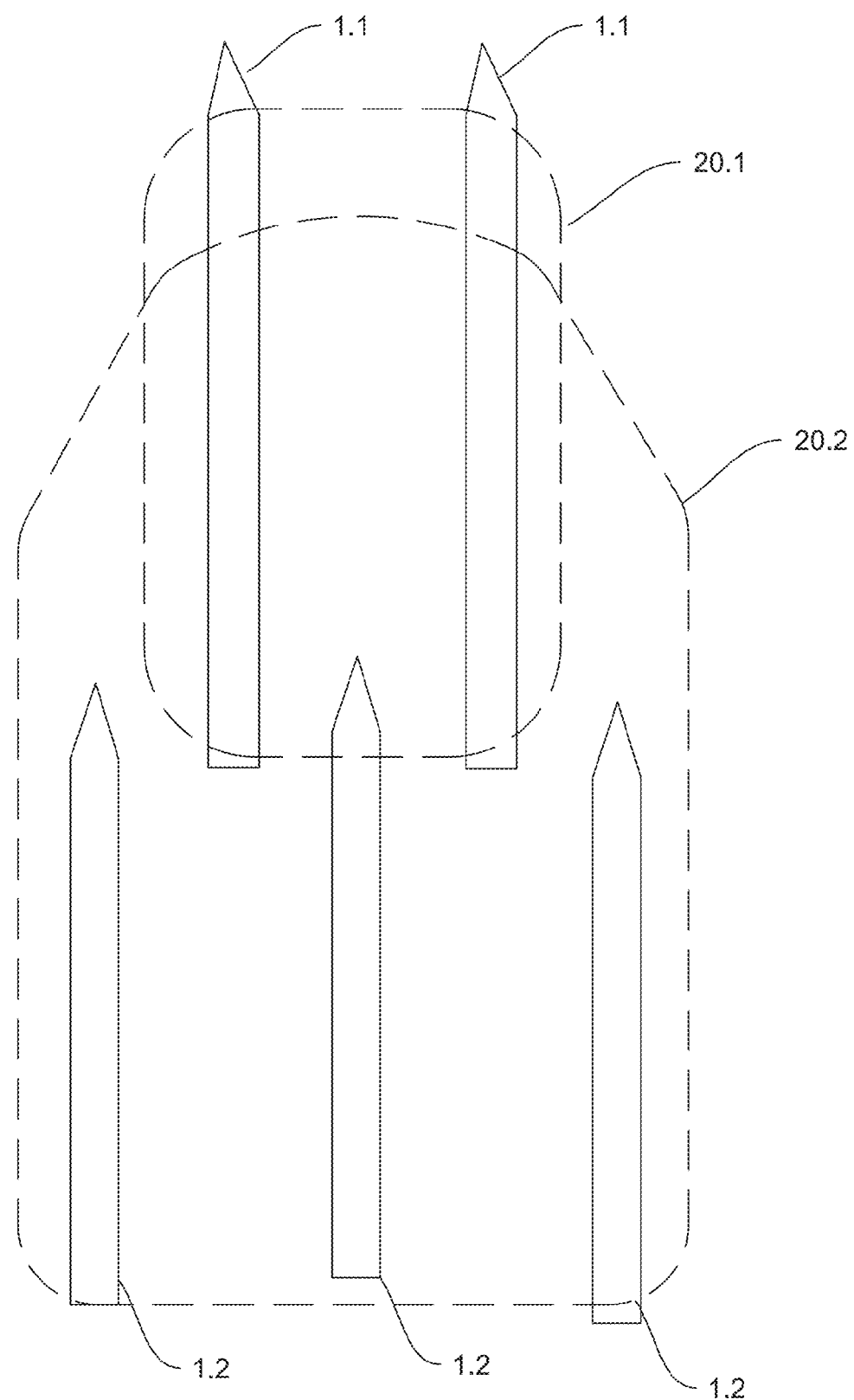
FIG. 6 depicts both a two-hull design and a five-hull design.
Figure 8A:
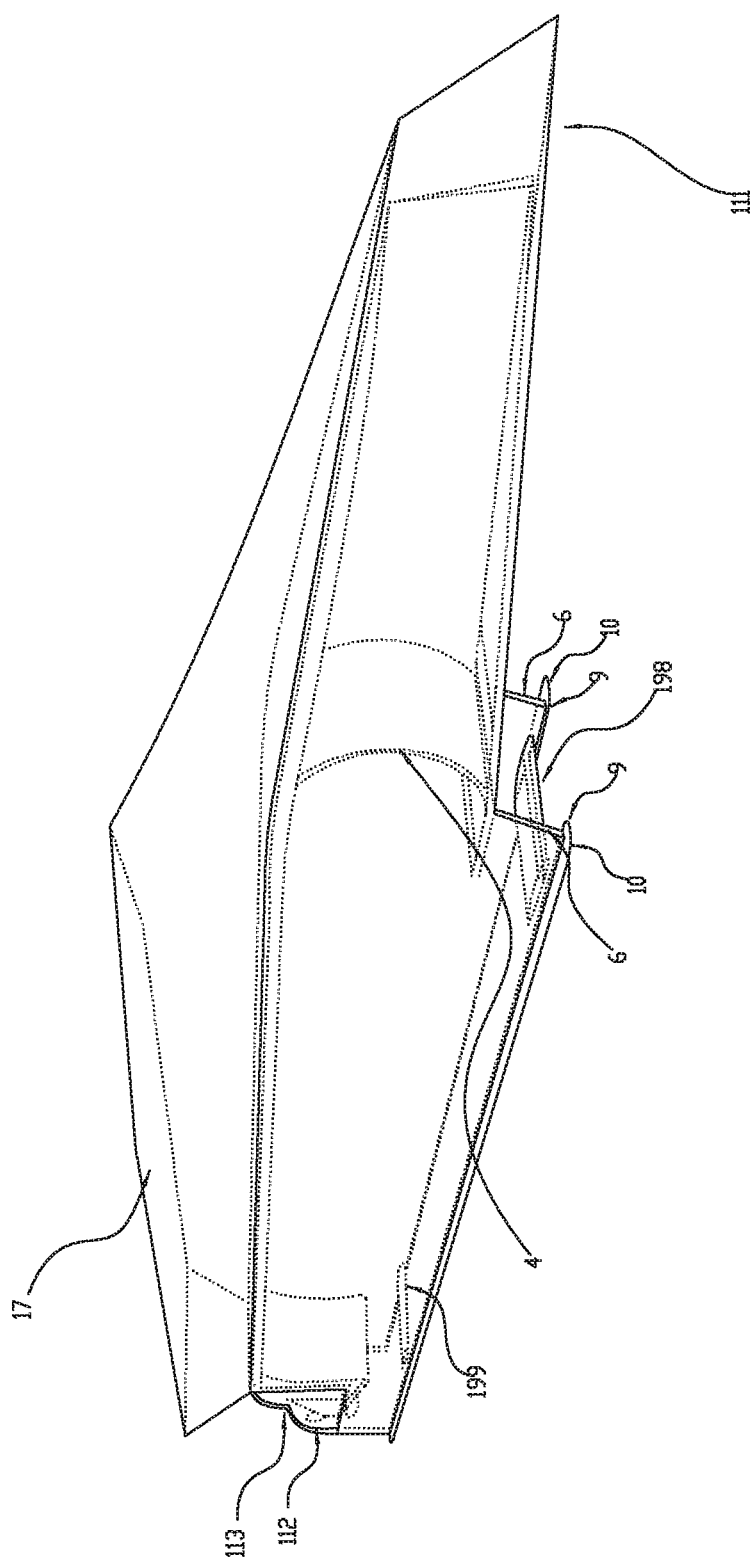
FIG. 8A and FIG. 8B depict front perspective views of an example hull of the invention.
Figure 8B:
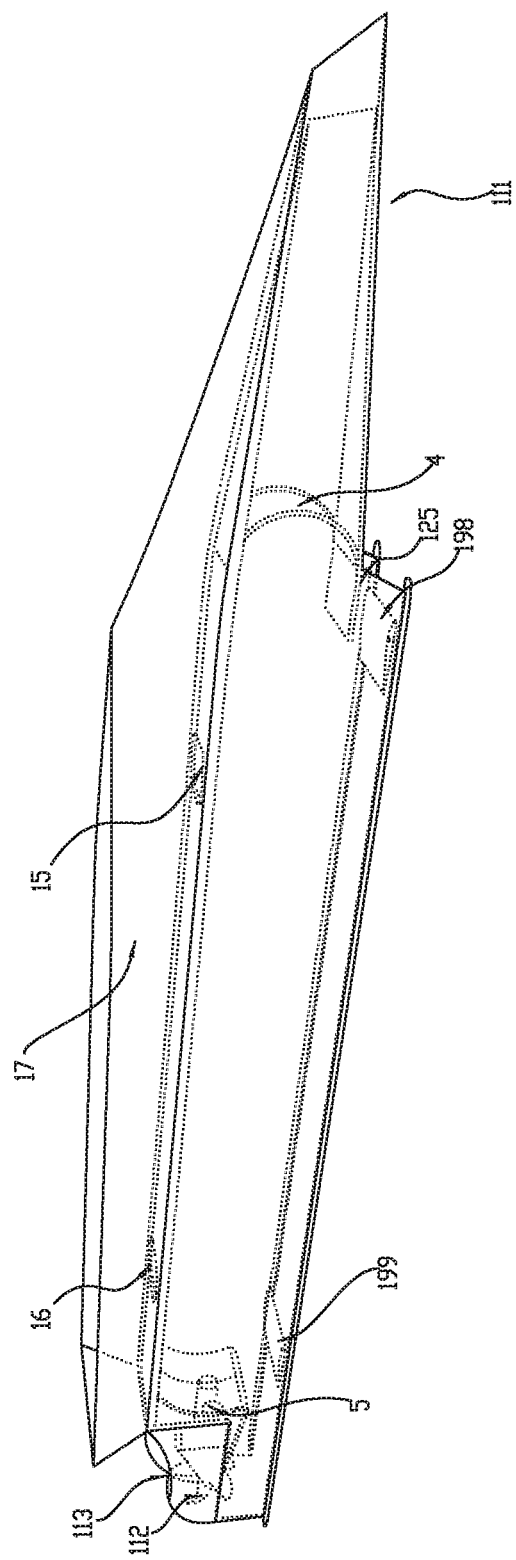
Figure 8C:
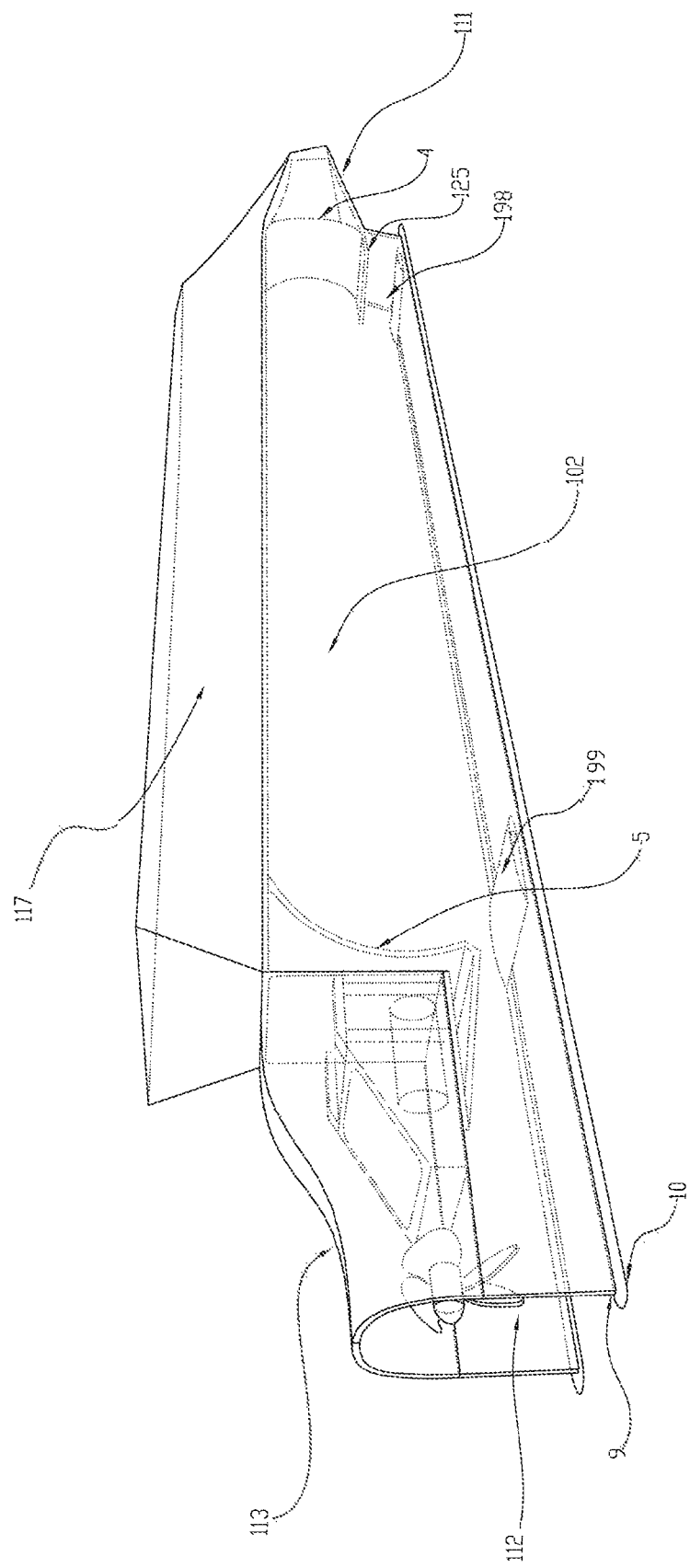
FIG. 8C depicts a rear a perspective of the hull depicted in FIG. 8A and FIG. 8B.

Optionally, the water vessel comprises a plurality a hulls of the invention e.g. 2, 3, 4, or 5 hulls. Optionally, the vessel comprises a plurality of laterally arranged hulls (e.g. as depicted in FIG. 2B). Optionally, the hull comprises a plurality of laterally arranged hulls and a plurality of longitudinally arranged hulls (e.g. as depicted in FIG. 6).

Optionally, the vessel comprises a plurality of laterally arranged hulls, wherein the distance between the hulls is from about 3 to about 20 times (e.g. about 3 to about 10 times or about 3 to about 7 times) the mean width of the air chamber of the hulls. Optionally, the lateral distance between each hull is greater than 3 (e.g. greater than 5 or greater than 7) times the width of the air chambers.

Optionally, the water vessel is configured to differentially control each hull (e.g. by air injectors or valves).

EXAMPLES

Example 1 Air Cushion Hull with a HAR Air Chamber, Stable Walls, Keel Fins, Wave-Piercing Bow FIG. 1A-FIG. 1D depict a hull of the invention. The hull comprises an air chamber 2 defined by a fore wall 4, an aft wall 5, an upper wall 3, and opposing sidewalls 6. The foe wall 4 and aft wall 5 are both stable, non-retractable wall. Air injector ports (not shown) are configured to deliver pressurized air to the air chamber to impart an air cushion.

The sidewalls 6 extend lower than the fore wall 4 and the aft wall 5. The hull comprises fins at the base of each side wall 6 ('keel fins'). The keel fins are elongated fins that span a greater longitudinal distance (e.g. the entire length of the side wall) than a lateral distance. Specifically, an inner keel fin 9 extends laterally inward from the base of each side wall 6 and an outer keel fin 10 extends laterally outward from the base of each sidewall. The keel fins 9,10 run longitudinally along the entire length of each sidewall 6.

The hull comprises a wave-piercing bow having a nose 11, an upper bow surface 31 that tapers upward to the upper wall 3, and a lower bow surface 32 that tapers downward to the base of the fore wall 4. The sides of the bow taper outwardly from the nose to the side walls 6. The nose 11 is positioned at a level between the upper wall 3 (i.e. the top of the air chamber) and the base of the fore wall 4 (i.e. the base of the air chamber). For example, as depicted in FIG. 1E and FIG. 2C, the nose can be at level that is closer to the level of the base of the air chamber than the top of the air chamber. As depicted in FIG. 2C, the air chamber 2 is configured to be pressurized such that the hull sits in the water with the nose 11 positioned, e.g. near sea level 26 or slightly submerged below sea level 26 (e.g. as, such that when the hull traverses through a wave 27, the nose 11 pierces the wave 27 and the upper bow surface 31 receives a down force from the wave 27, thereby reducing the bouncing effect typically experienced by buoyant hulls as they pass over a wave. The bouncing effect is further reduced by the combination of the lower bow surface 32 and the keel fins 9, 10. As the hull traverses through water (e.g. a wave or still water), the lower bow surface 32 directs water to the upper surface of the keel fins 9,10 imparting a down force the keel fins 9,10 and providing an ant-lift and stabilizing effect. To enhance the down force imparted by the upper bow surface 31 relative to any lift imparted by the lower bow surface 32 as the hull traverses through water, the upper bow surface 31 can optionally be tapered at a steeper angle than the lower bow surface 32 and/or provided with a greater surface area (e.g. longer and/or water) for contact with water.

The hull comprises a propeller 12 aft of the aft wall 5 which sits inside a shroud 13. The propeller 12 can be, e.g. a surface propeller having only its lower portion submerged while cruising. Among other functions, the shroud 13, which is optionally formed by the combination of a top wall and portions of sidewalls 6 and keel fins 9,10 that extend aft of the aft wall 5, reduces lateral movement of water in the area just aft of the propeller 12 and aids in directing propulsion force to the rear.

As depicted in FIG. 1E, the hull comprises a high aspect ratio (HAR) air chamber having an air chamber height greater than the air chamber width. For example, the air chamber height is optionally about 1.5 to about 2 times greater that the width. The HAR air chamber provides superior shock absorbing capacity and the ability to raise and lower the hull at will (e.g. by a controller coupled to air injectors), e.g. to present the hull in a desired orientation prior to encountering a wave or other water feature.

Example 2 Hull with Recirculating Air Flow

FIG. 2A-D depict water vessel comprising a deck 20 having top 21, and further comprising a hull 1 of the invention, e.g. as detailed in Example 1, configured with an air chamber 2 having recirculating air flow. The hull comprises an air injector 7 positioned about the base of fore wall 4 aimed astern. The fore wall 4 and the aft wall 5 are both curved and/or provided with a ramped section at the base and upper edges. Such a configuration imparts air flow 33 which travels astern just above the water surface 28 in the air chamber 2 until it reaches the base of the curved aft wall 5, where it ramps up the curve and is redirected forward along the upper wall 3 before reaching the curved fore wall 4, which redirects the air flow 33 back into the path of the air injector 7. Optionally, the hull comprise a second air injector 8 positioned about the upper wall 3 and aimed forward to enhance the recirculating motion of the air 33.

This configuration recirculates air within the air chamber 2 and reduces air escape from the under the lower edge of the aft wall 5. Prior art air chamber hulls attempt to minimize air escape by tapering the air chamber height down at the rear. However, the recirculating air chambers taught herein are capable of reducing air escape, even without such a taper. Additionally or alternatively, the recirculating air creates a configuration in which the water is displaced by air that moves astern with the water at the water surface and with the hull at the upper wall, thus reducing drag and providing other advantages, e.g. as taught herein.

Without being bound by theory, it is believed that as the hull traverses through water with a pressurized air chamber 2, water passes under the fore wall 4 and experiences a ripple wave 29 imparted by the lower edge 37 of the fore wall 4. The air injector 7 (or a row of laterally arranged air injectors) is optionally positioned to discharge directly at this ripple wave 29. Further, it is believed that a small amount of water 30 will ramp up the lower edge of the aft wall 5, thus blocking the escape of air flow 33 under the aft wall 5.

Optionally, the hull comprises an air flow separator 34, as depicted in FIG. 3 to aid in separating forward air flow from rearward air flow, e.g. to prevent interaction (e.g. turbulence) between rearward traveling air flow along the lower portion of the air chamber and forward traveling air flow along the lower portion of the air chamber. The present invention contemplates hulls with or without an air flow separator.

The deck 20 is mounted on the hull 1 by deck supports 23. The underside of the deck or "wet deck" 24 is elevated above sea level over the hull 1. The deck optionally comprises a permanent flotation device 22, which can, e.g. provide a backup safety floatation device to prevent sinking in case of emergencies (e.g. damage to the air chamber).

Example 3 Hull with Vented Air Chamber

In one embodiment, a hull of the invention (e.g. as detailed in Example 1 or Example 2) comprises a vented air chamber. The vented air chamber can be formed by providing one or more valves that allow escape of air from the air chamber 2. The one or more valves can be controlled, e.g. to reduce the air pressure in the air chamber 2 and thereby reduce buoyancy of the hull. Such control of buoyance can be used to dampen the effect of an incoming wave on the hull (e.g. heave or pitch).

As depicted in FIG. 2C, the hull optionally comprises a plurality of valves that allow escape of air from different location of the air chamber 2, such as a first valve 15 provided at a first location near the bow or other forward location and a second valve 16 provided at a second location near the stern or other location astern of the first location. In such an embodiment, the valves 15,16 can be differentially controlled to provide an instantaneous reduction air chamber pressure local to the respective valve, e.g. to control pitch of the hull. For example, valve 15 can be controlled to release air from the bow portion of the air chamber 2 just as a front wave is predicted (e.g. estimated by a user or calculated by a wave predicting computer) to impact the bow of the hull, thus reducing the bounce or pitching effect of the wave on the hull.

Optionally, the valves connect the air chamber 2 to a secondary chamber 17. The secondary air chamber 17 can be used to receive the air from the air chamber 2 and, for example, temporarily contain the air for use elsewhere such as for discharging into a propeller air duct 14. The air duct 14 can receive an air supply from anywhere, e.g. an air inlet 19 connected to the secondary air chamber 17. Such discharge of air into a propeller air duct 14 helps blow water spay away from the propeller improving obstruction free rotation. This advantage is optionally enhanced in a hull comprising a propeller shroud.

Example 4 Hull Having Expandable Air Chamber Walls

In one embodiment, a hull of the invention (e.g. as detailed in Example 1, Example 2, or Example 3) comprises an air chamber having at least one expandable wall. Optionally, a dampening chamber is provided on side of the expandable wall opposite the air chamber 2. The expandable wall can be any wall that moves or expands to increase the volume of the air chamber. For example, as depicted in FIG. 2C, the air chamber 2 can have fore wall 4 constructed as a membrane (e.g. flexible bladder) having the air chamber 2 on one side and a dampening chamber 18 on the side opposite the air chamber 2. Such a configuration can be used, e.g. to provide a shock-absorbing air chamber 2. For example, an instantaneous rise in the water level 28 inside the air chamber 2 could be caused by certain scenarios such as a hull bounce, a sudden net down force experienced by the hull, any scenario in which the hull experiences or a sudden submergence. The risen water level 28 inside the air chamber 2 would occupy a portion of the air chamber volume, and sharply compress the air in the air chamber 2 causing a hard shock experienced the hull. However, an expandable air chamber wall can expand or move outward (e.g. into the dampening chamber 18) to compensate for the volume of air chamber 2 instantaneously occupied by the risen water level 28, thus providing shock absorption. Such a hull with an expandable wall can be used alone or in combination with one or more release valves 15,16. While certain embodiments of the invention provide one or more pressure-release valves 15,16 that can be configured to reduce such a shock, the air that escapes from the valves as a result of a sudden rise in the inner water level 28 chamber can, in some instances, result in a subsequent reduction in air chamber buoyancy, for example, where the duration subsequent reduction in air chamber buoyancy is dependent on the on the rate at which air injectors 7, 8 can repressurize the air chamber. In circumstances such as this, the expandable wall can provide shock-absorption while retaining air chamber air (e.g. without losing air through valves 15,16).

FIG. 7A and FIG. 7B depict a hull with exemplary configurations for expandable walls.

FIG. 7A depicts a hull having a fore wall 4 and an upper wall 35, each comprising a membrane (e.g. flexible bladder). On the side of each membrane opposite the air chamber 2, the hull comprises a dampening chamber, 36, 39 that is pressured to tailor resting position of the respect membrane and/or the expandability of the respective membrane, i.e. propensity of the membrane to expand due to a pressure increase inside air chamber 2 cha. The hull optionally comprises a port through which air can be injected and/or released from the respective dampening chamber. For example, the amount of air in dampening chamber 36 can be controlled by injecting or releasing air through port 38. Similarly, the amount of air in dampening chamber 36 can be controlled by injecting or releasing air through port 40.

FIG. 7B depicts a hull having a fore wall 4 comprising a membrane, as in FIG. 7A. As an expandable upper wall, the hull comprises a movable wall (e.g. rigid wall), that moves up and down to expand the volume of the air chamber 2. For example, as depicted in FIG. 7B the moveable wall can comprise e.g. a piston 41 connected to piston shafts 42 that moves up and down in dampening chamber 39. As in the membrane configuration depicted in FIG. 7A, a dampening chamber 39 is provided on the side of the piston 41 opposite that of the air chamber 2, and the amount of air in the dampening chamber 39 is governed through port 38.

Example 5 Hull Having Stable and Adaptive Walls

In one embodiment, a hull of the invention (e.g. as detailed in Example 1, Example 2, Example 3, Example 4) comprises an air chamber 2 enclosed by a stable wall. Optionally, the air chamber comprises a wall having a stable upper wall and an adaptive lower wall. For example, as depicted in FIG. 2C, the hull can comprise a stable upper fore wall such as fore wall 4 (e.g. a membrane protected from oncoming water by the hull bow) and an adaptive lower fore wall such as hinged flap 25. The upper fore wall does not retract upon impact with water (noting that, in the depicted example, the upper fore wall is protected by a bow having nose 11, upper surface 1, and lower surface 32). However, if the hull raises relative to the water surface 26 (e.g. due to wave heave or piercing through a wave and becoming partially airborne in the trough that follows the wave peak) the flap 25 can lower and prevent air escape from the air chamber 2 (note that the drawing shows flap 25 in a partially retracted state, however, in conditions in which the water line is at water line 26, the flap 25 would be fully retracted). Accordingly, such a configuration combines the advantages of a stable wall and an adaptive wall, providing a smoother, less bumpy ride, with enhance shock absorbing capabilities provided by the stable fore wall along with a reduced propensity to lose air pressure suddenly if the lower edge of the stable wall rises out of the water or otherwise loses contact with the water, e.g. due to the ability of the adaptive wall to lower in height to remain in contact with the water surface and prevent or reduce air loss, thus maintaining a stable depth.

Example 6 Optional Features

FIGS. 8-17 depicts optional features that are useful hulls of the invention.

As detailed herein, an air chamber hull can comprise an air chamber 2 defined by a fore wall 4, an aft wall 5, side walls 6, and one or more keel fins such as inner keel fin 9 and/or outer keel fin 10. The air chamber hull can optionally comprise a propeller such as surface propeller 112, a propeller shroud such as a propeller shroud 113, and a wave piercing bow 111. The air chamber hull can optionally comprise a secondary air chamber 17 and one or more pressure release valves 15, 16, as detailed herein.

As shown in FIGS. 8A-C and FIG. 9, the hull optionally comprises one or more foils such as a fore foil 198 and an aft foil 199. The one or more foils are positioned to remained submerged during travel and are configured to maintain hydrodynamic equilibrium while traveling through water. Optionally, the foils are adjustable to adjust the amount of lift provided. For example, an operator may increase the angle to provide greater lift at low speeds and reduce the angle to reduce the amount of lift at higher speeds. The foils can optionally be deep foils configured as a cross member that span between sidewalls 6 to enhance stability and structural integrity to the sidewalls.

Figure 10A:
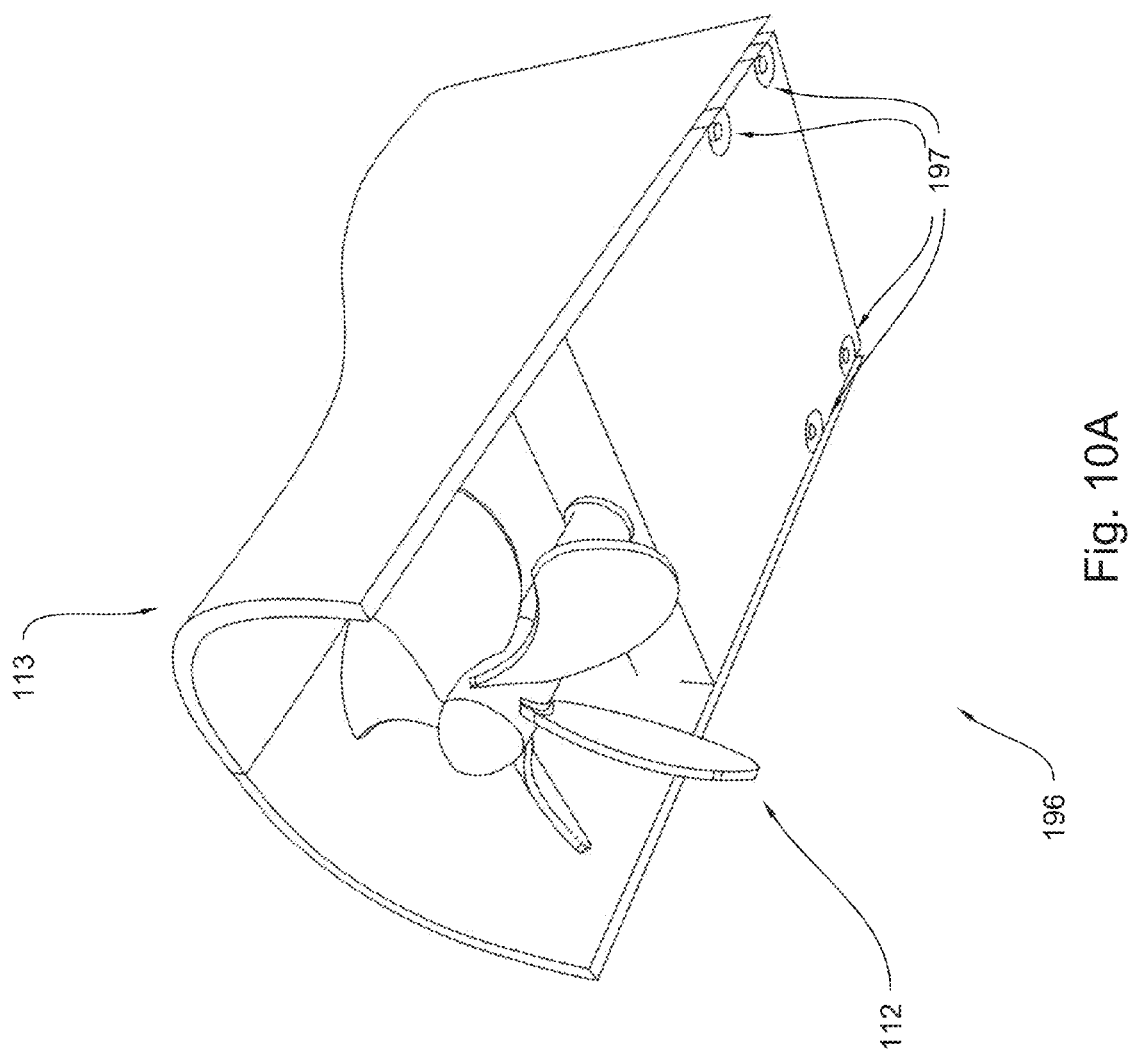
FIG. 10A depicts an adjustable propeller useful in the present invention.
Figure 10C:
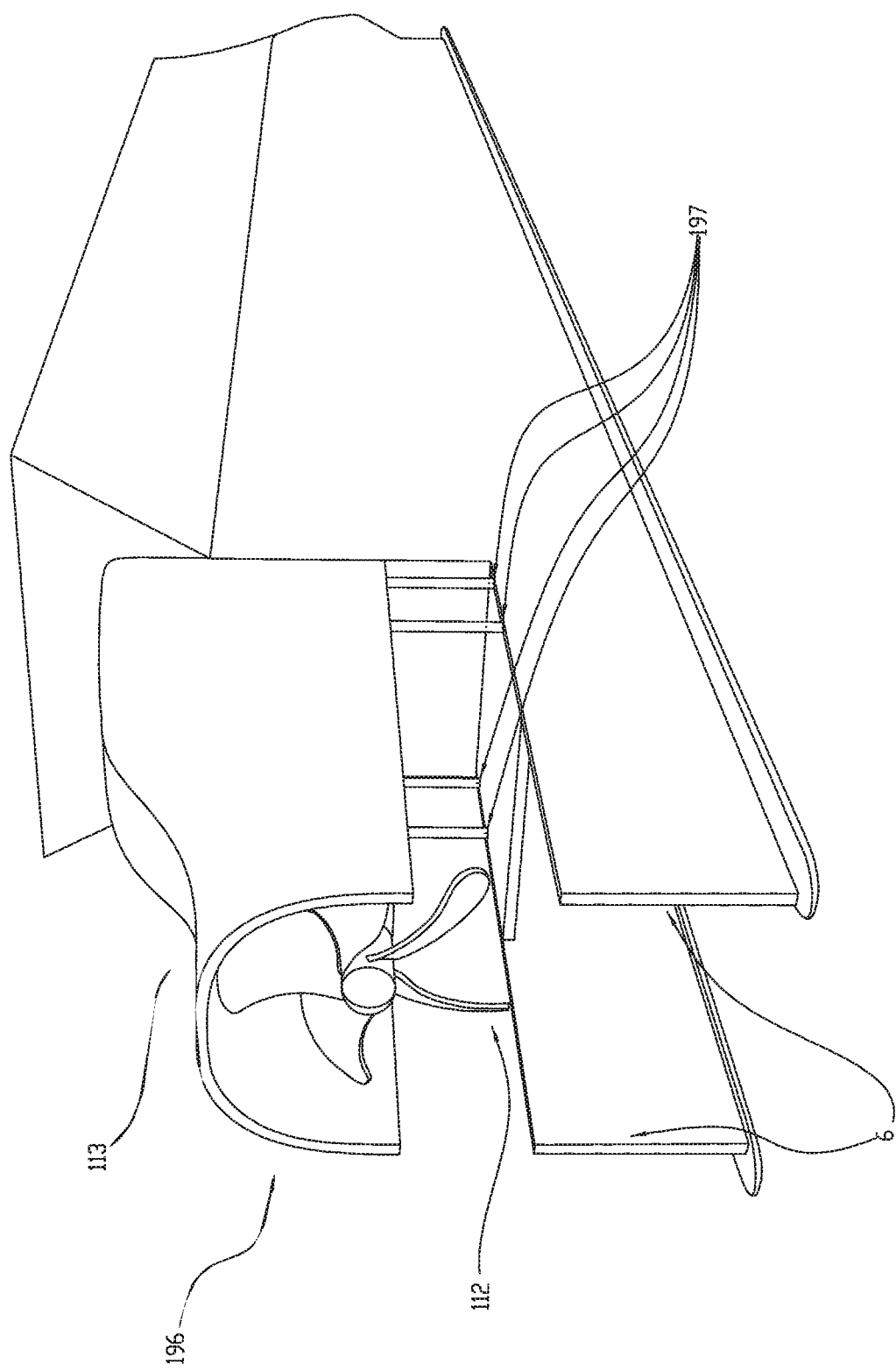
FIG. 10C depicts a hull of the invention having an adjustable propeller at a raised position.
Figure 10D:
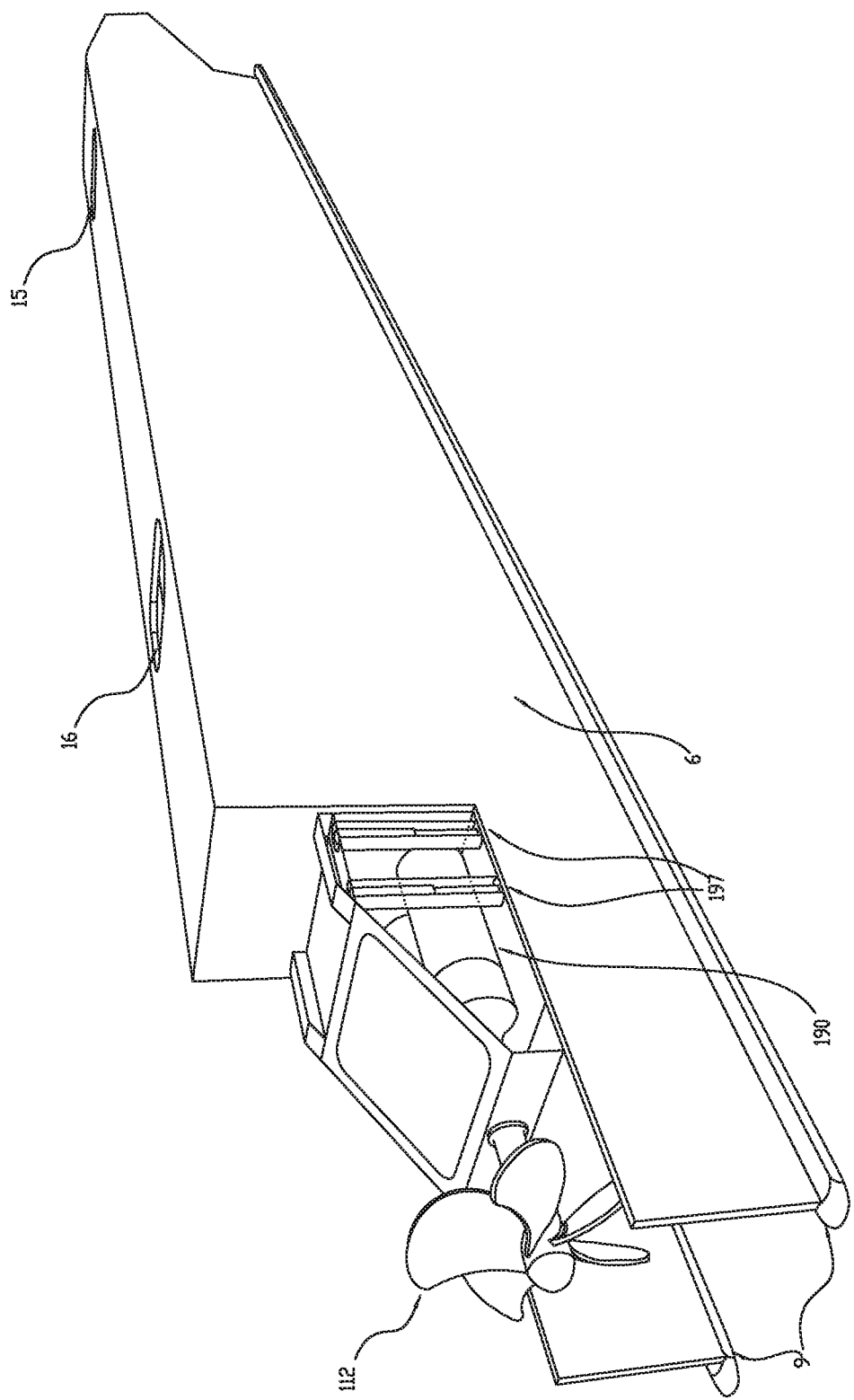
FIG. 10D depicts a hull of the invention having an adjustable propeller.

As shown in FIG. 10A-10D, the hull optionally comprises an adjustable height propulsion mechanism 196 comprising a propeller such as surface propeller 112, one or more risers 197, and, optionally, a propeller shroud 113. Such a mechanism can be, e.g. used to raise or lower a propeller such as surface propeller 112, e.g. such that the propeller height can be adjusted to position the propeller center at the water line which can change relative to the hull depending, e.g. on the speed of the hull. FIG. 10B shows the propeller 112 and shroud 113 at a lowered position, with the propeller center even with the water line. FIG. 10C shows the propeller 112 and shroud 113 at a raised position. FIG. 10D depicts the adjustable height propulsion mechanism 196 without the shroud 113.

Figure 9:
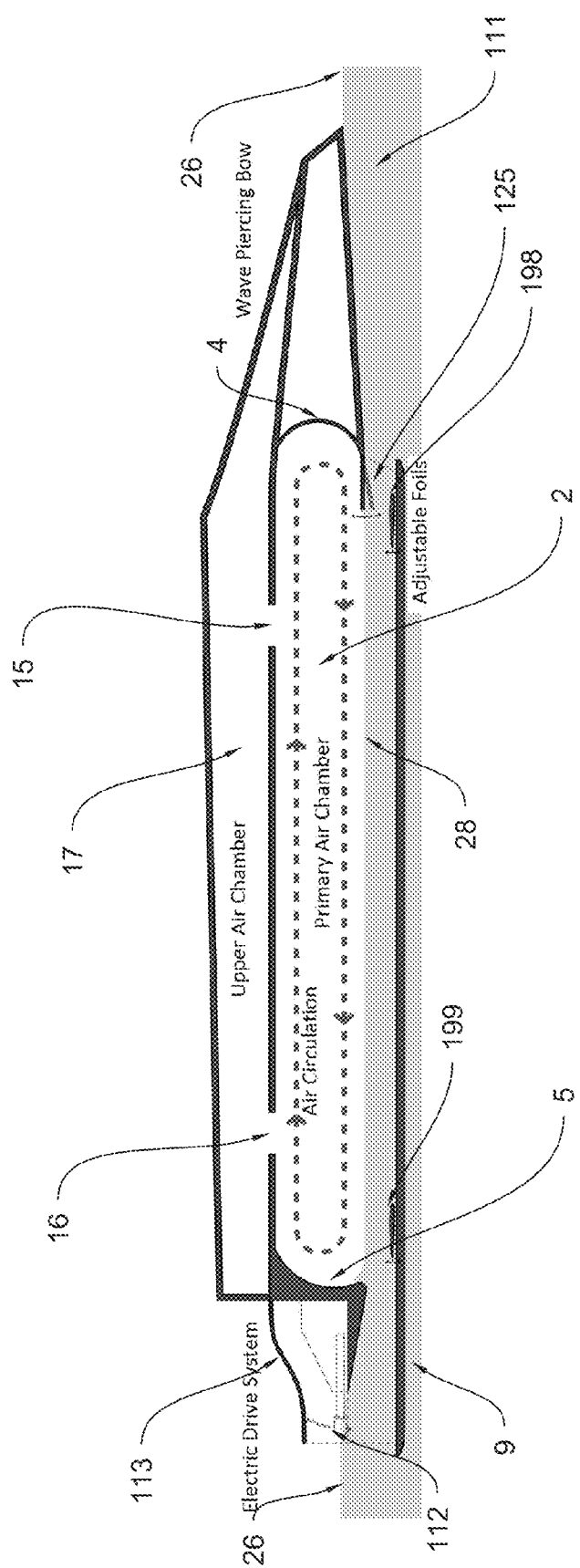
FIG. 9 depicts a sectioned view of an exemplary hull of the invention. The section is made from a vertical plane that extends longitudinally down the centerline of the hull. The hull is shown traveling in water
Figure 11:
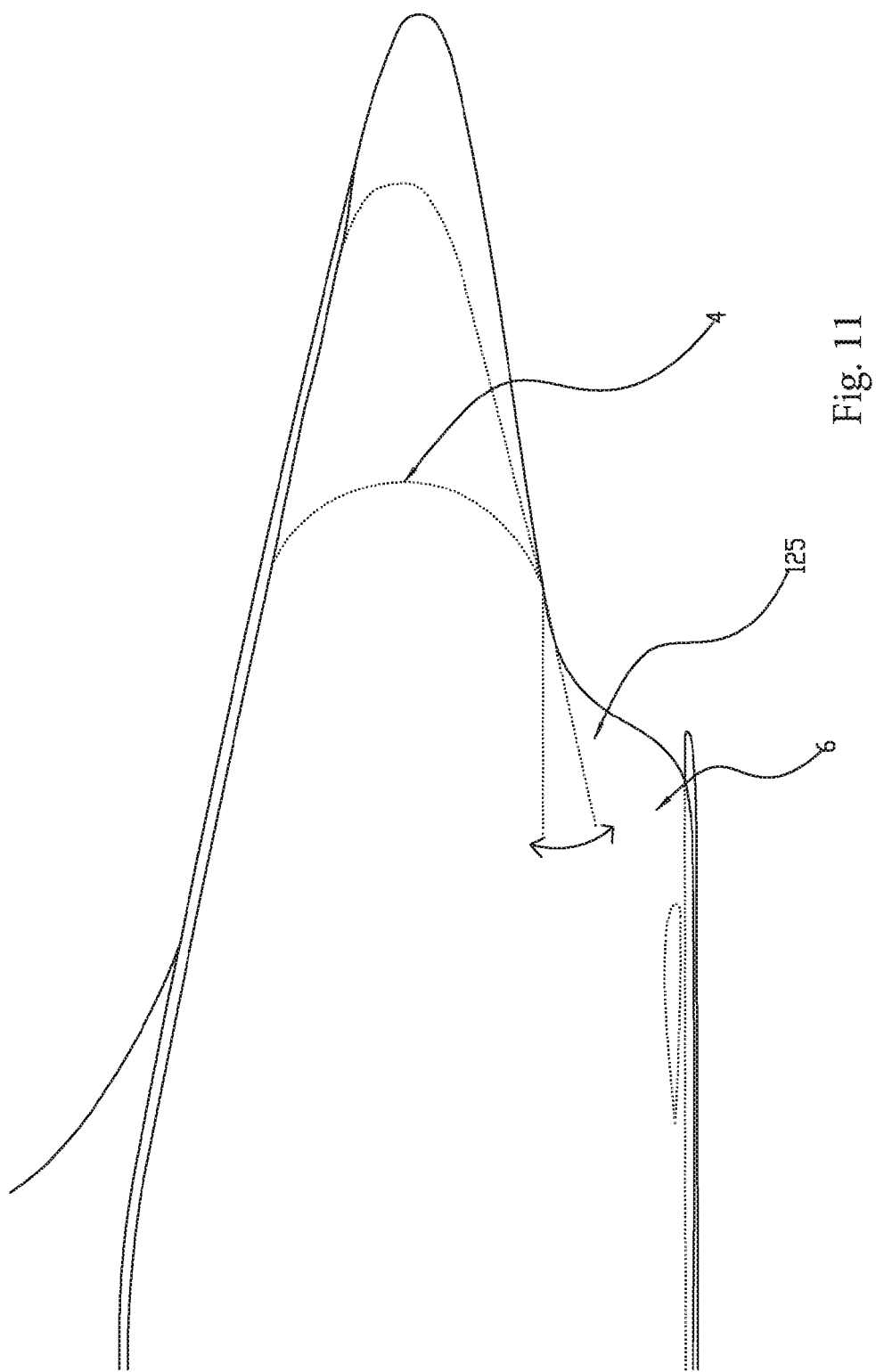
FIG. 11 depicts a portion of a hull of the invention showing an adaptive wall having a flap.

As shown in FIG. 9 and FIG. 11, the hull can optionally comprise a flap 125 as an adaptive wall member. The flap 125 maintains contact with the water to prevent escape of air from the air chamber 2. While the hull is traveling through the water, the flap 125 pushed by incoming water to raise the flap 125, such that it does not create excessive drag, while still remaining in contact with the water surface.

Figure 12A:
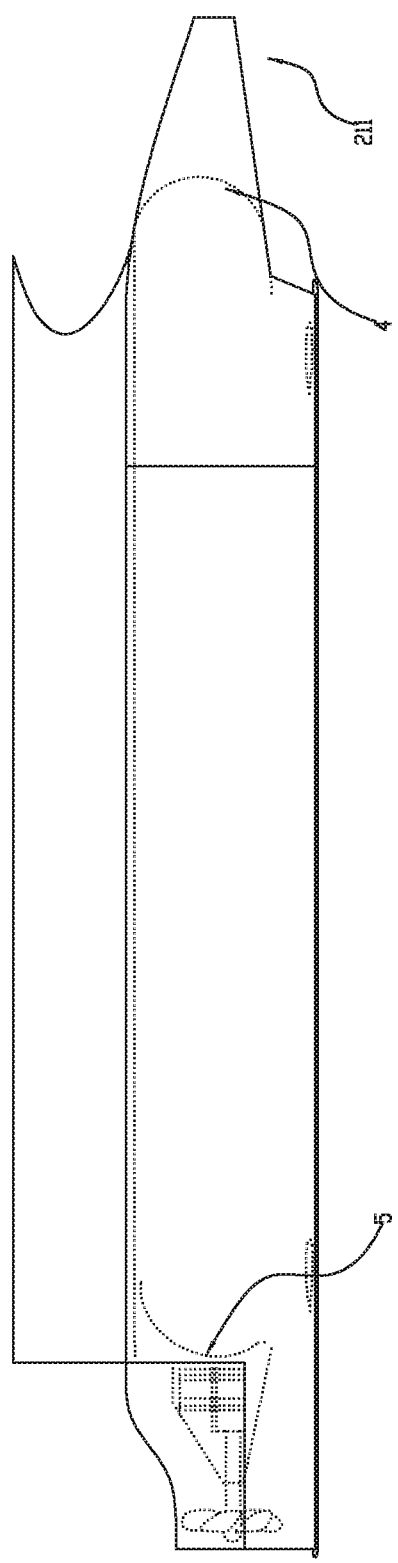
FIG. 12A and FIG. 12B depict side view and perspective view, respectively, of a hull of the invention having an axe wedge wave piercing bow.
Figure 12B:
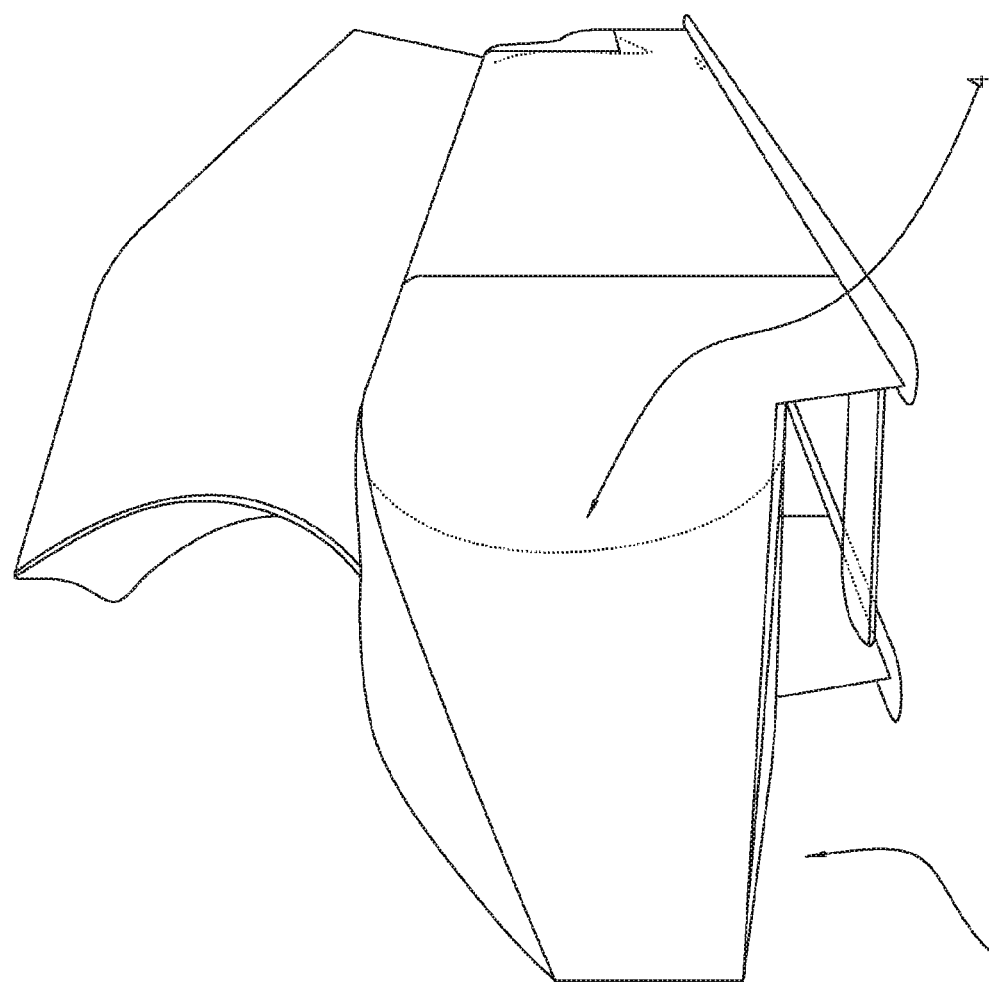
Figure 13A:
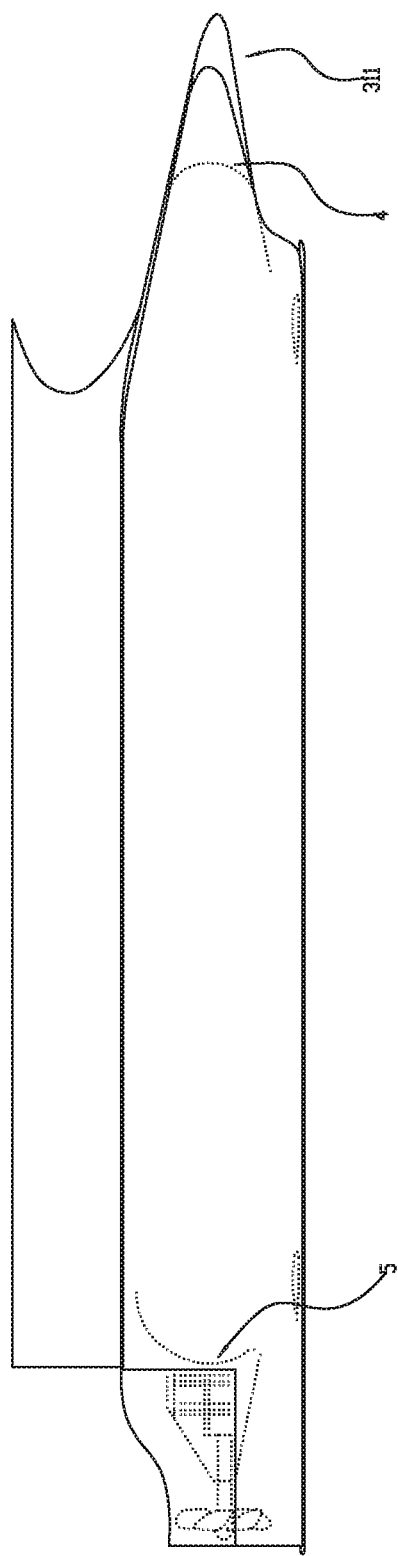
FIG. 13A and FIG. 13B depict side view and perspective view, respectively, of a hull of the invention having a bottle nose wave piercing bow.
Figure 13B:
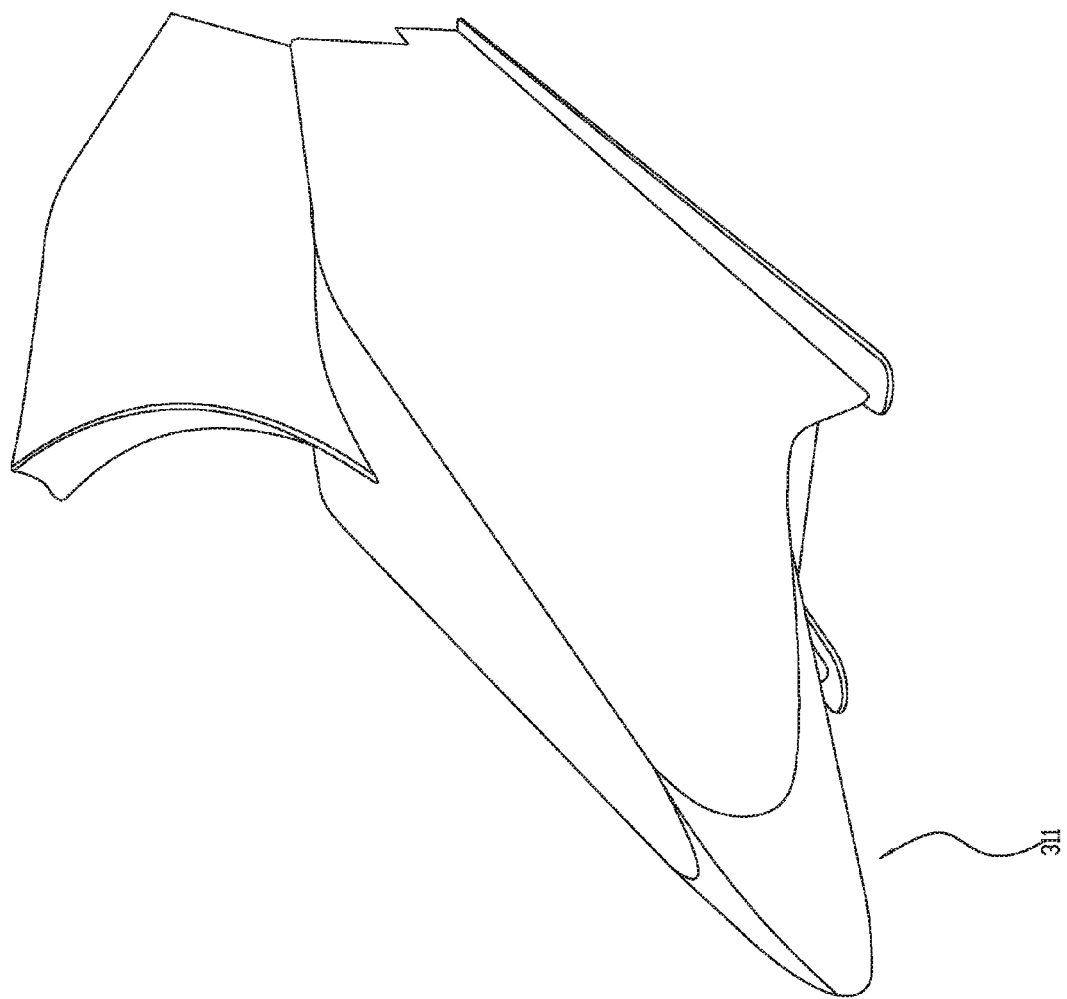
Figure 14A:
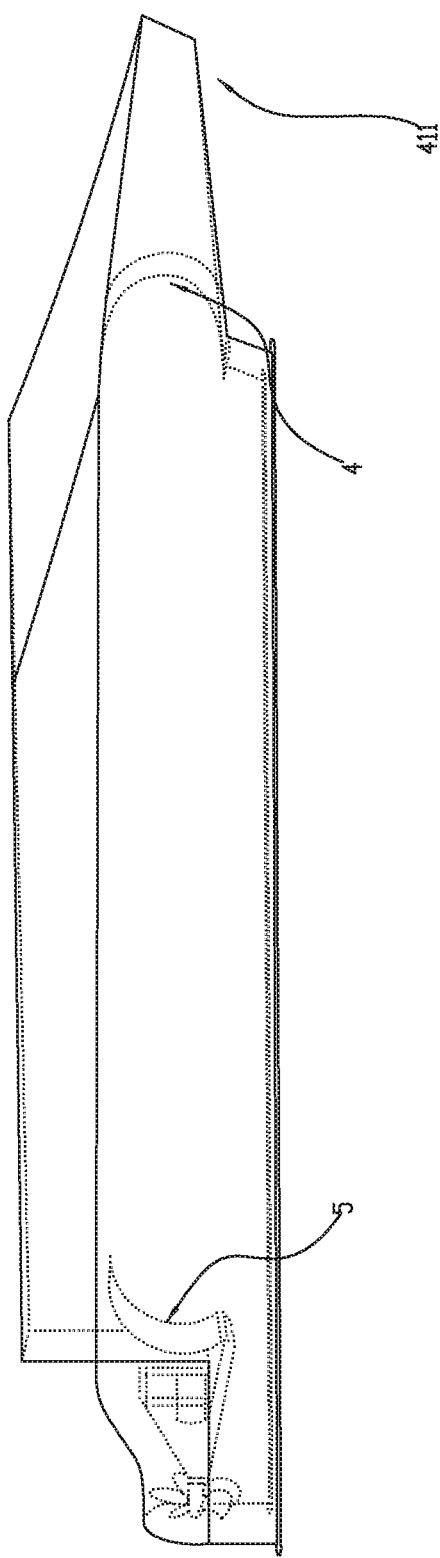
FIG. 14A and FIG. 14B depict side view and perspective view, respectively, of a hull of the invention having a forward rake wave piercing bow.
Figure 14B:
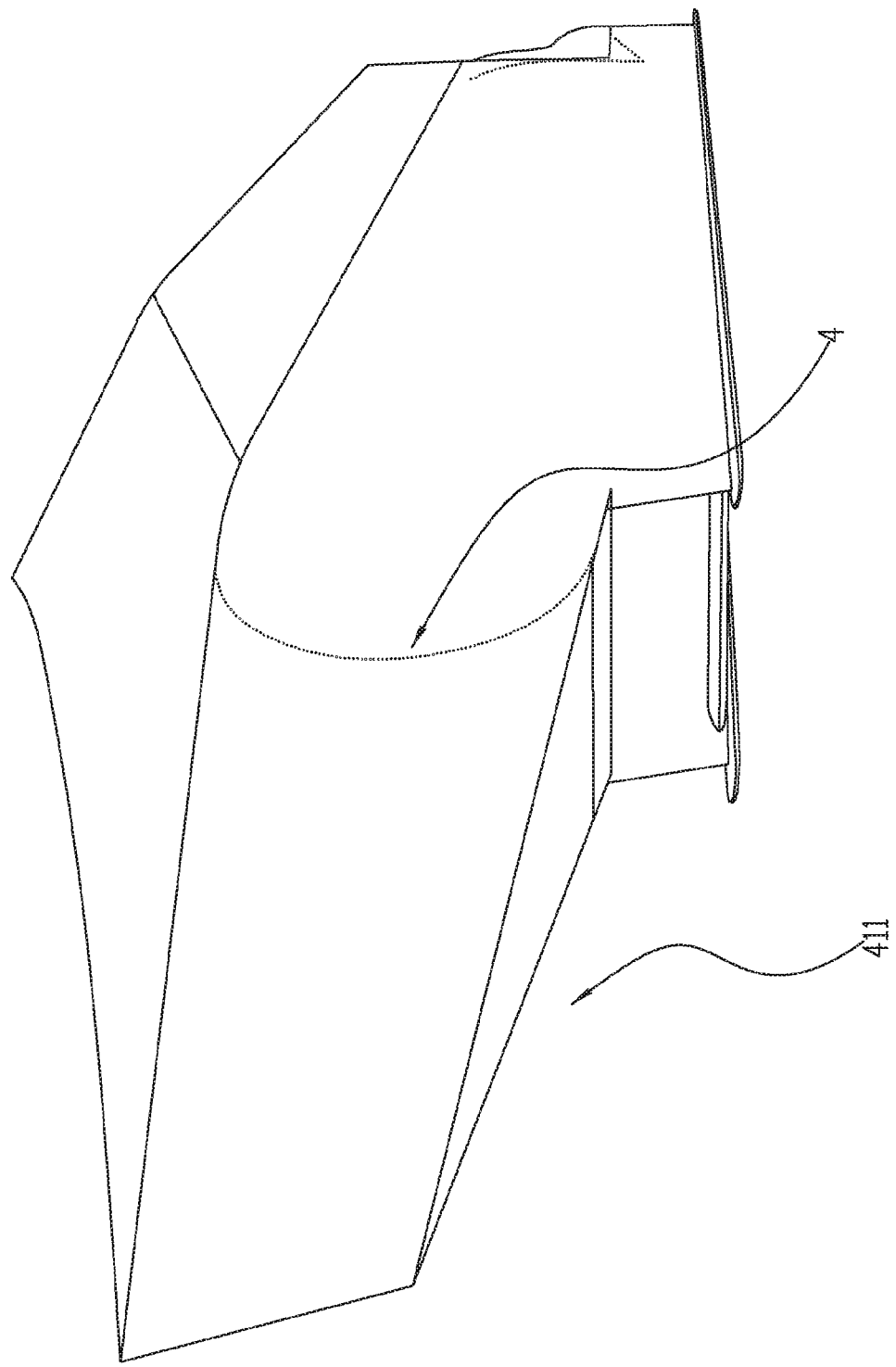

Optionally, a hull of the invention comprises a bow with any wave piercing shape. For example, the bow can be a reverse rake wave piercing bow, as depicted in can have a FIG. 8 through FIG. 9. As another example, the bow can be an axe-wedge bow as depicted in FIGS. 12A and 12B. As another example, the bow can be a bottle nose bow, as depicted in FIGS. 13A and 13B. As another example, the bow can be a forward rake bow as depicted in FIGS. 14A and 14B.

Figure 15A:
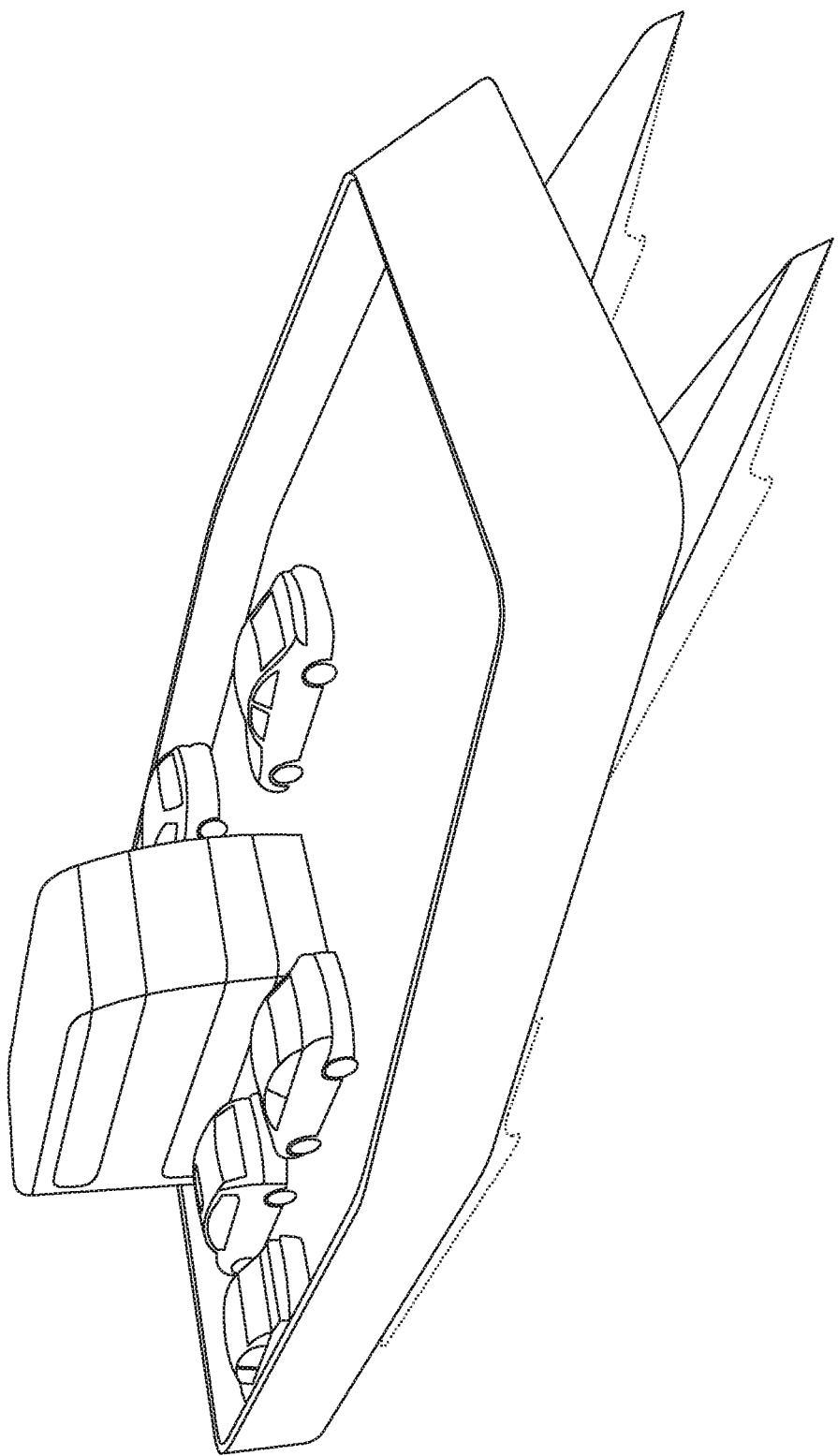
FIG. 15A and FIG. 15B depict an upper perspective view and a lower perspective view, respectively, a water craft of the invention traveling in water.
Figure 15B:
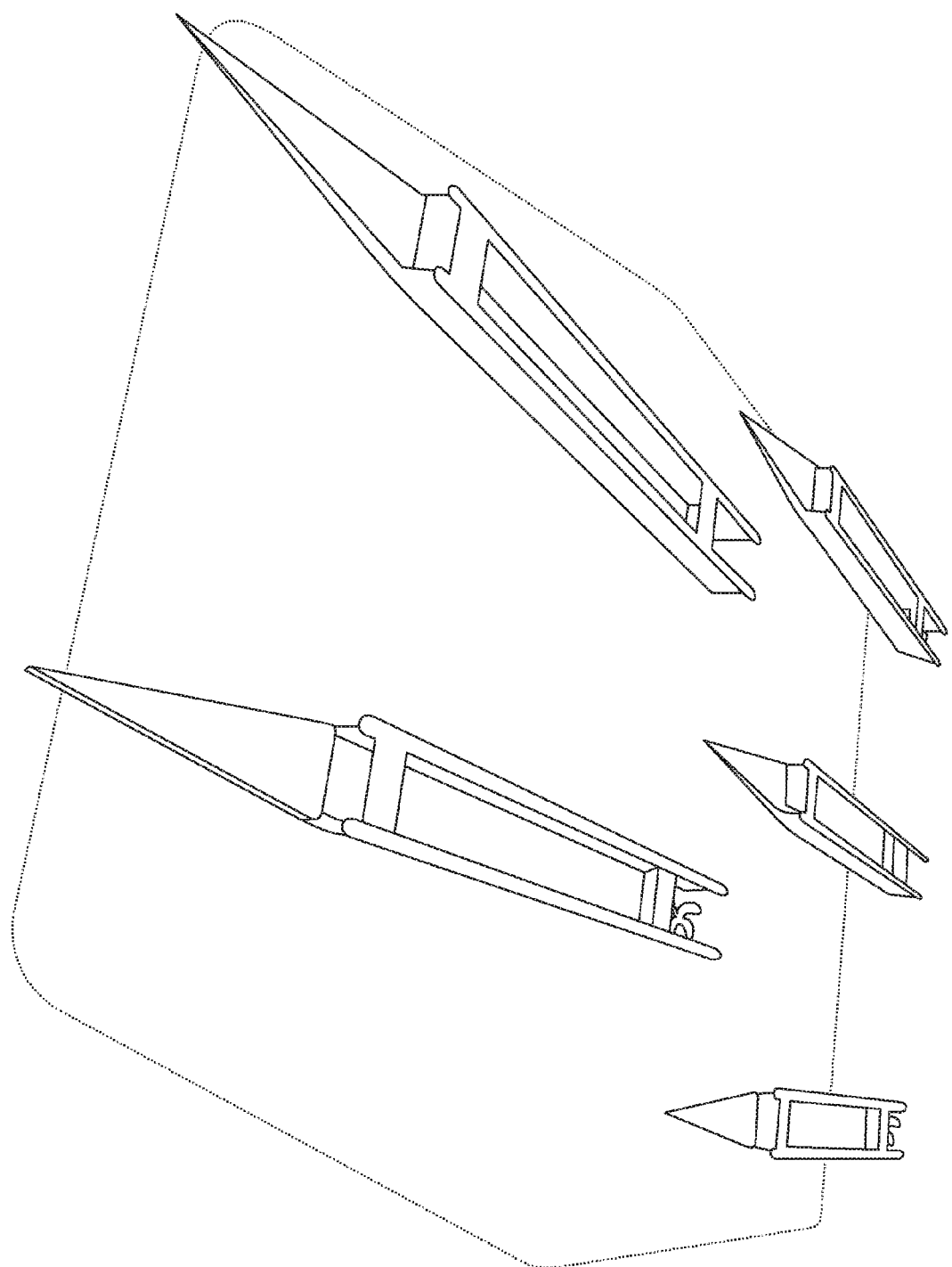
Figure 16A:
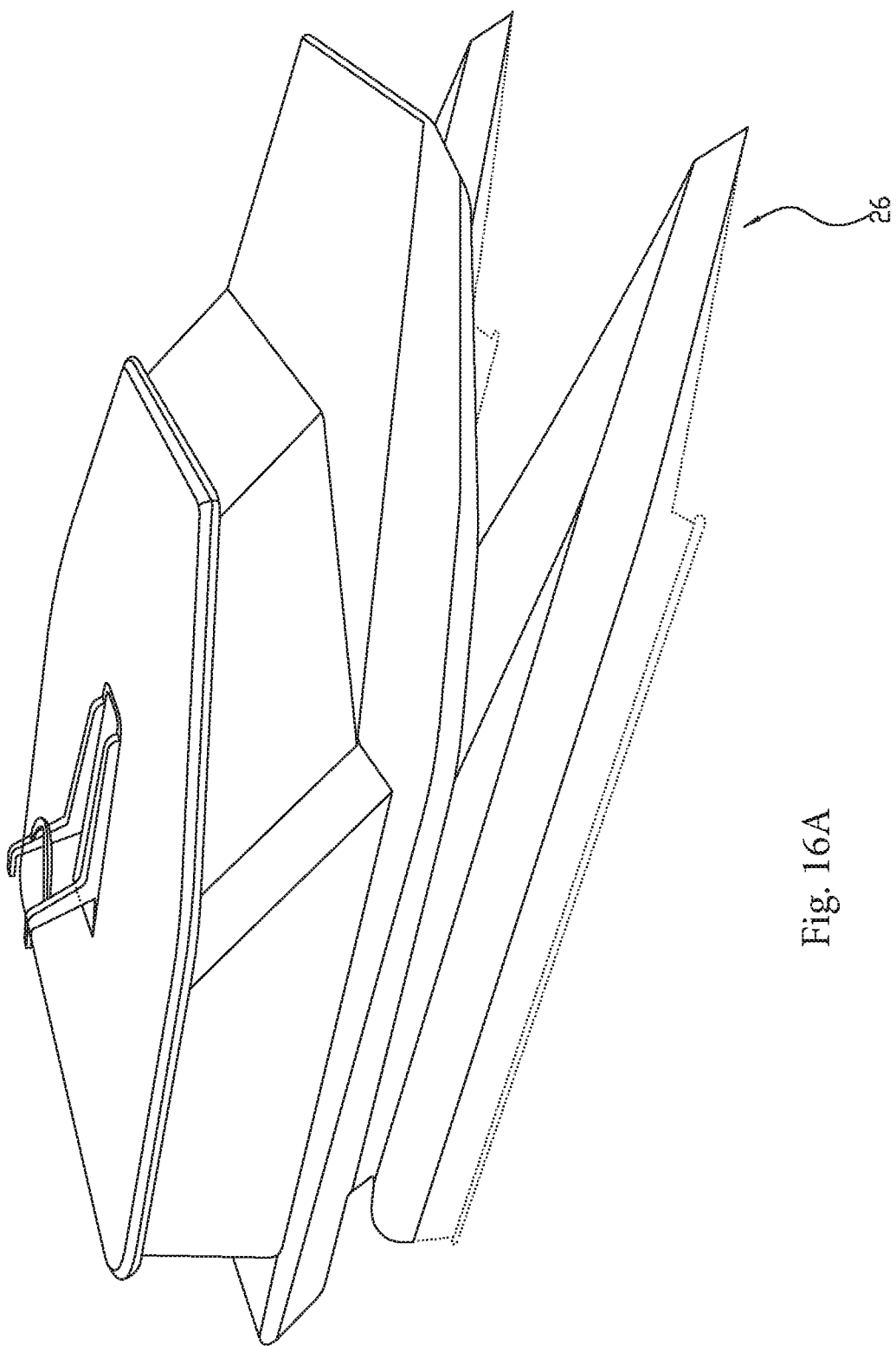
FIG. 16A, FIG. 16B depict a front perspective view and a first rear perspective view, respectively, a water craft of the invention traveling in water.
Figure 16B:
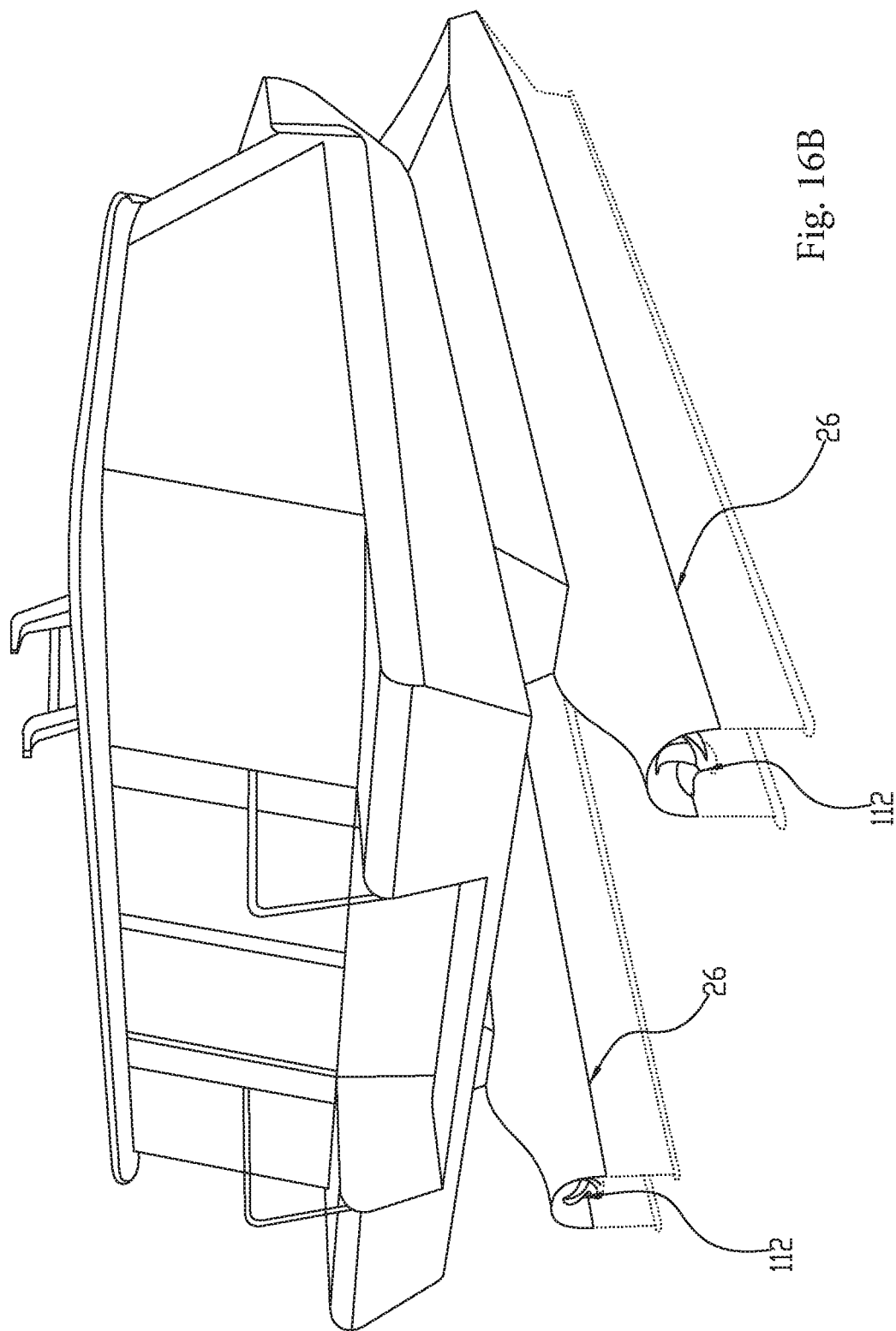
Figure 16C:
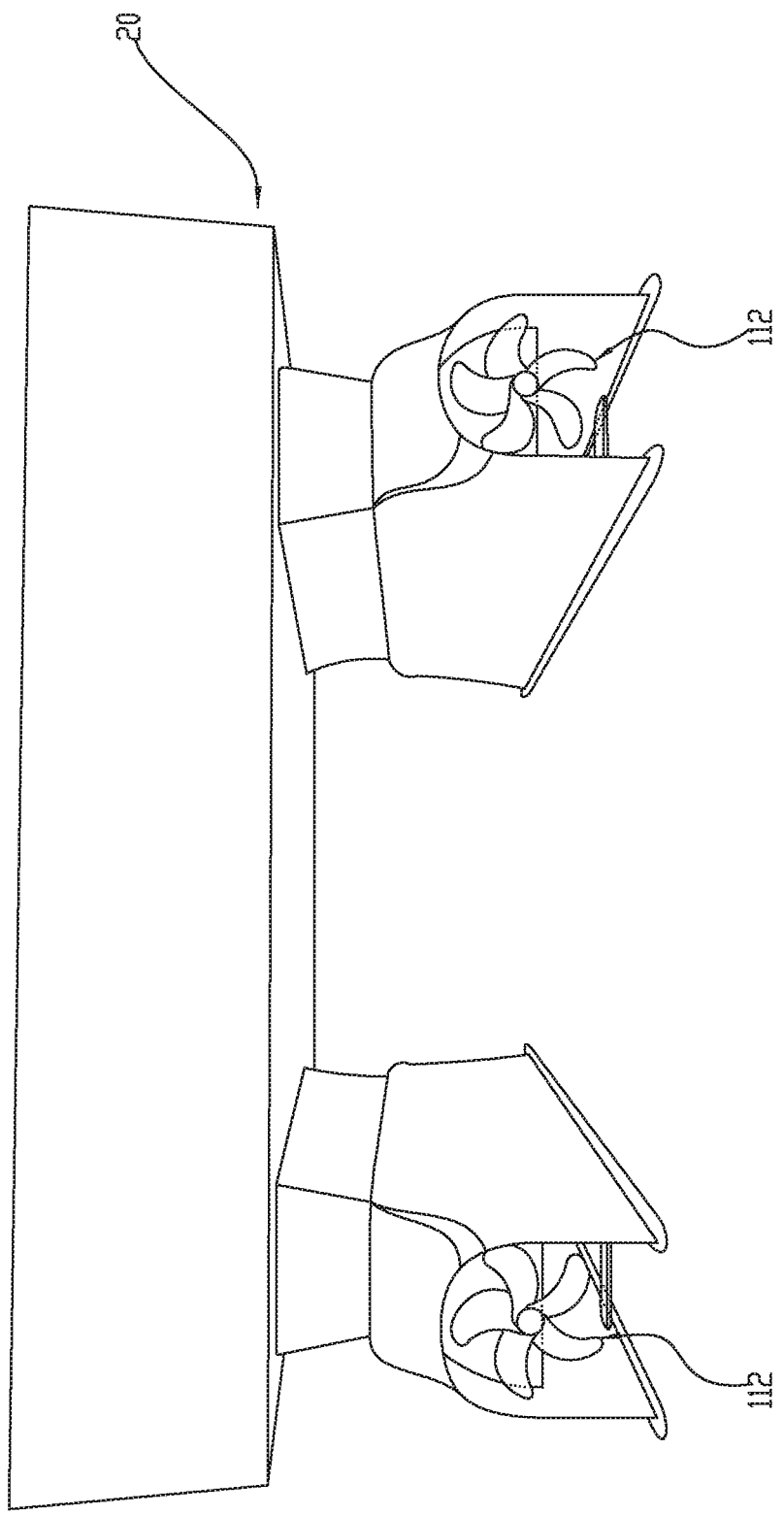
FIG. 16C depicts a second rear perspective view of a portion of the water craft.
Figure 16D:
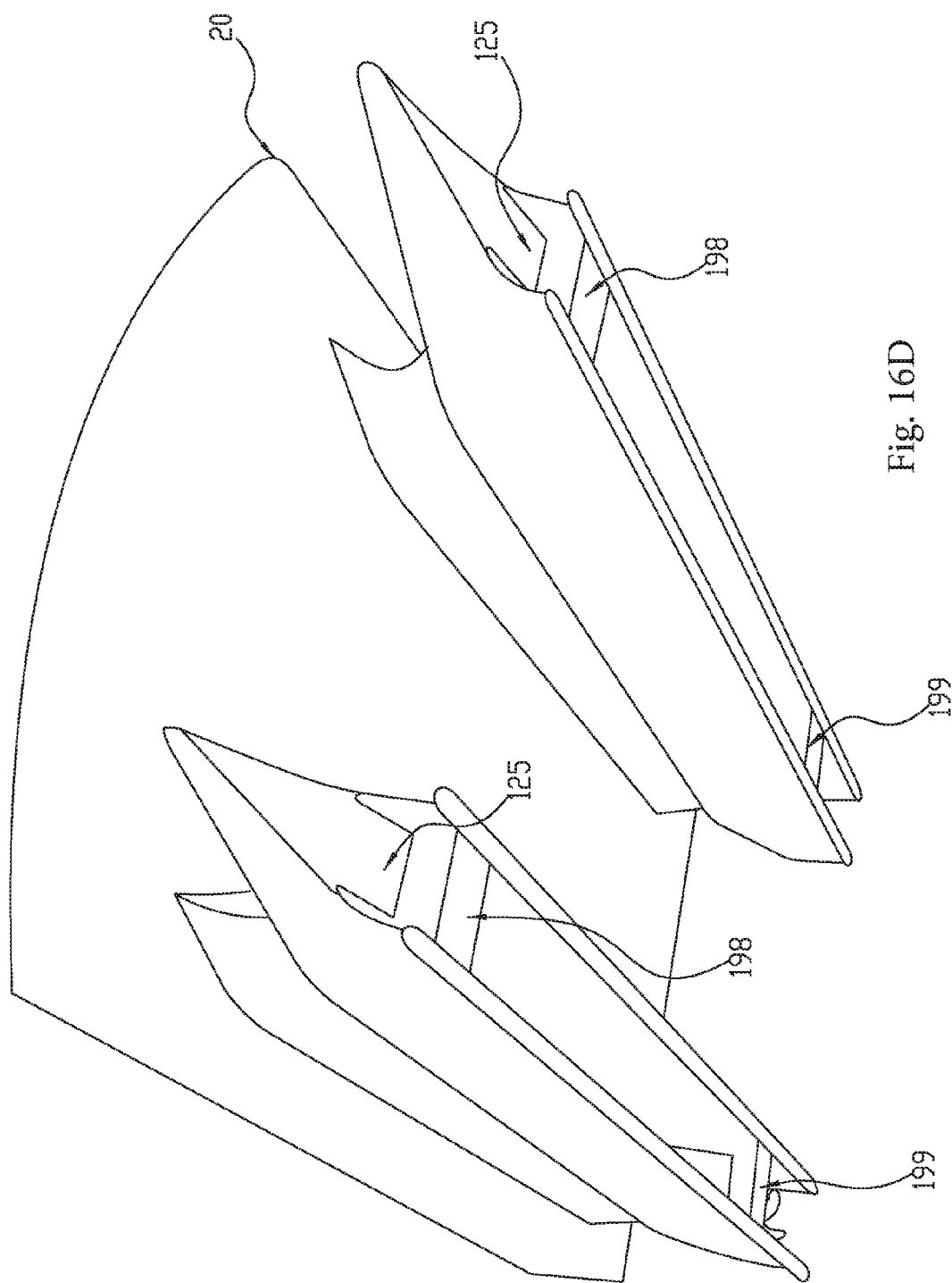
FIG. 16D depicts a lower perspective view of a portion of the water craft.
Figure 16E:
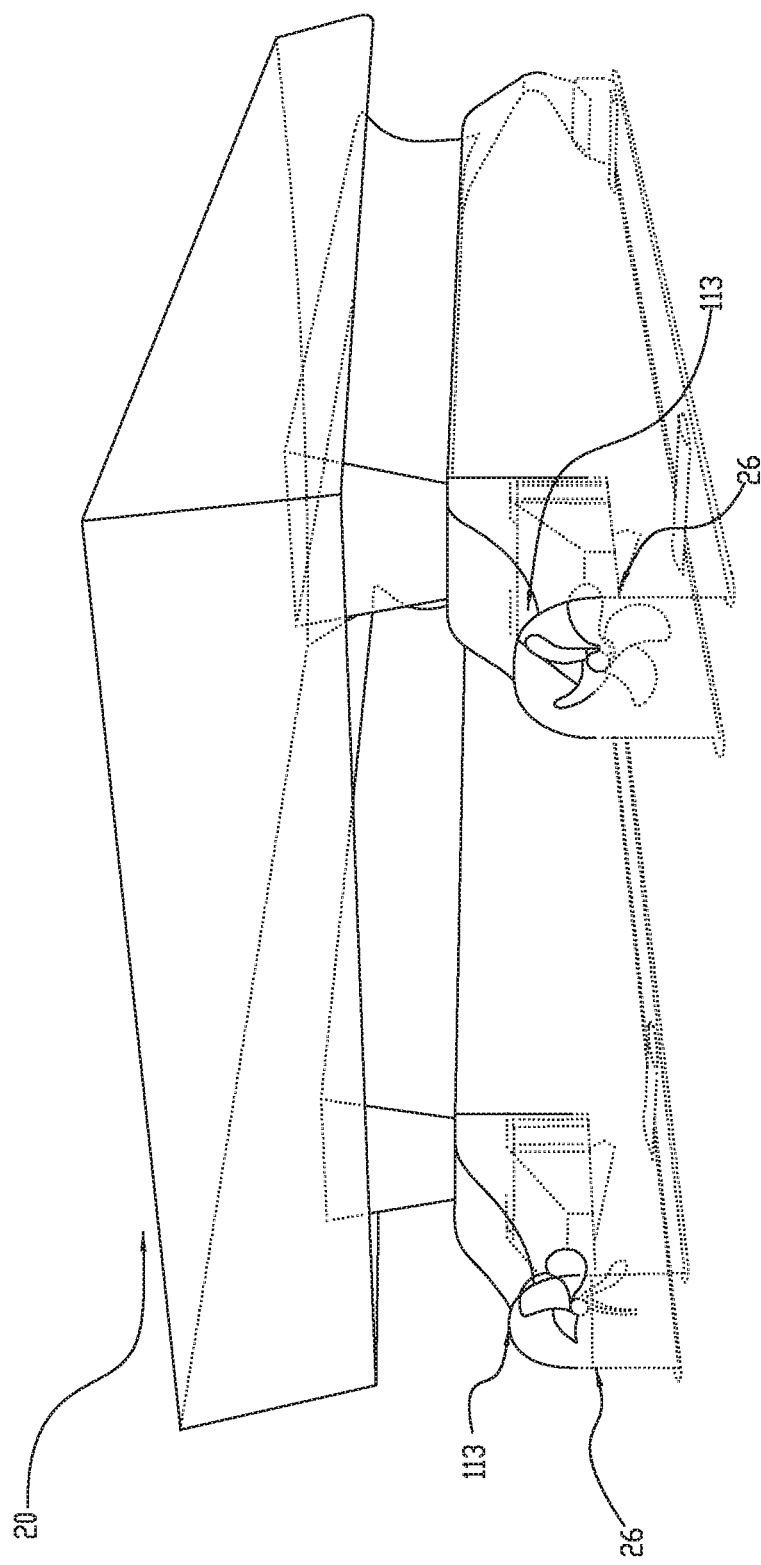
FIG. 16E depicts a third rear perspective view of a portion of the water craft traveling in water.
Figure 16F:
FIG. 16F depicts a front perspective view of a portion of the water craft traveling in water.

Optionally, the invention provides water craft having a plurality of hulls, e.g. as depicted in FIGS. 15-16. For example, the water craft can be a ferry (e.g. an automobile ferry) as shown in FIG. 15A, which optionally comprises a plurality of aft hulls and a plurality of fore hulls in which the air chamber pressure can be independently to compensate for offset loads (note FIG. 15A depicting the automobiles grouped at the stern).

Figure 17A:
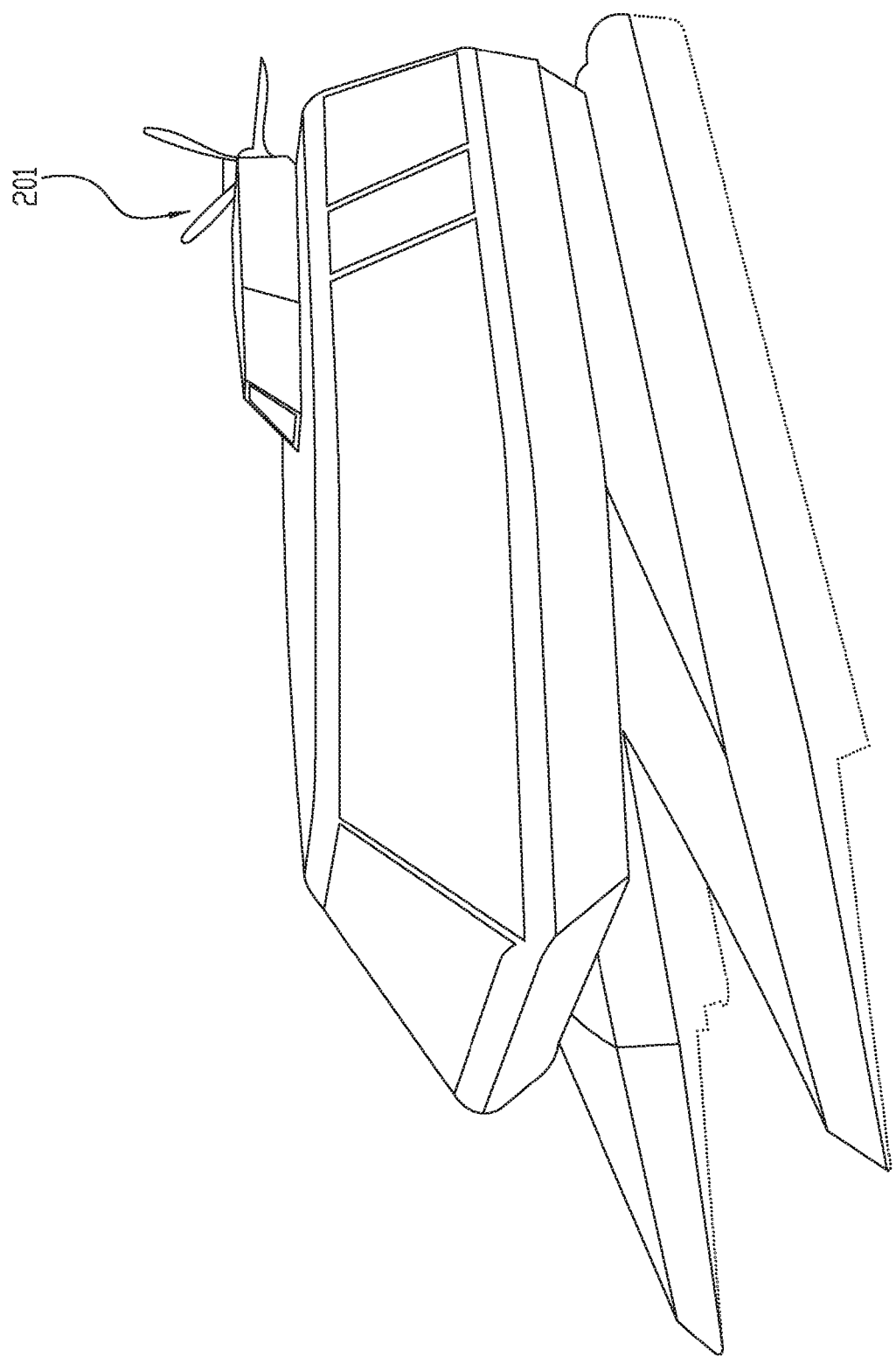

As depicted in FIG. 17A and FIG. 17B, a water craft of the invention optionally comprises an air propeller 201, e.g. in addition to or as an alternative to a water propeller 112. The air propeller 201 can optionally be a turbo prop. Optionally, the air propeller is fuel powered (e.g. diesel) and the water propeller is battery powered. Optionally, the air propeller is fuel powered (e.g. diesel) and the water propeller is battery powered and the air propeller is configured to charge the battery of the water propeller.

The citations provided herein are hereby incorporated by reference for the cited subject matter.

I claim:

1. A water vessel hull comprising an air chamber and at least one air injector configured to deliver air to the air chamber, wherein:
    the air chamber comprises an open base and is enclosed by an upper wall, a fore wall, an aft wall, and sidewalls;
    the sidewalls extend lower than the fore wall and the aft wall;
    each of the side walls, the fore wall, and the aft wall comprises a stable wall;
    the hull comprises a bow forward of the fore wall; and
    a nose of the bow is positioned at a height that is lower than the top of the air chamber and higher than a base of the air chamber; and
    optionally, the nose of the bow is positioned at a height that is closer to the height of a base of the stable fore wall than the height of the top of the stable fore wall.

2. The hull of claim 1, wherein the bow comprises an upper surface that is tapered upward from the nose astern.

3. The hull of claim 2, wherein the bow comprises a lower surface that is tapered downward from the nose astern.

4. The hull of claim 3, wherein the, wherein the bow comprises side surfaces that taper outward from the nose astern.

5. A water vessel hull comprising an air chamber and at least one air injector configured to deliver air to the air chamber, wherein:
   the air chamber comprises an open base and is enclosed by an upper wall, a fore wall, an aft wall, and sidewalls;
   the sidewalls extend lower than the fore wall and the aft wall; and
   each of the side walls, the fore wall, and the aft wall comprises a stable wall; and
further comprising fins extending laterally from each side wall, wherein:
   the fins extend laterally from the side walls at a location lower than the base of the air chamber, optionally, wherein the fins extend laterally from the base of the side walls;
   the fins are elongated fins; and
   the longitudinal span of the elongated fins is at least about 10 times greater than the lateral span of the elongated fins, optionally wherein ratio of the longitudinal span of the elongated fins to the lateral span of the elongated fins is at least about 15:1, at least about 20:1, or at least about 30:1.

6. A water vessel hull comprising an air chamber and at least one air injector configured to deliver air to the air chamber, wherein:
   the air chamber comprises an open base and is enclosed by an upper wall, a fore wall, an aft wall, and sidewalls;
   the sidewalls extend lower than the fore wall and the aft wall; and
   each of the side walls, the fore wall, and the aft wall comprises a stable wall; and
further comprising fins extending laterally from each side wall, wherein:
   the fins extend laterally from the side walls at a location lower than the base of the air chamber, optionally, wherein the fins extend laterally from the base of the side walls; and
   the fins comprise a fin that extends inwards from the each sidewall and a fin that extends outwards from the each sidewall, optionally wherein the fin that extends inward extends inward from the each side wall at a location lower than the air chamber and the fin that extends outward extends outward from the each side wall at a location lower than the air chamber.

7. The hull of claim 6, wherein the lateral span of the fin that extends outwards is greater than the lateral span of the fin that extends inwards.

8. The hull of claim 6, wherein the fins are fins that do not provide substantial hydrodynamic lifting forces.

9. The hull of claim 6, wherein the fins comprise lipped outer fins.

10. A water vessel hull comprising an air chamber and at least one air injector configured to deliver air to the air chamber, wherein:
    the air chamber comprises an open base and is enclosed by an upper wall, a fore wall, an aft wall, and sidewalls;
    the sidewalls extend lower than the fore wall and the aft wall; and
    each of the side walls, the fore wall, and the aft wall comprises a stable wall; and
further comprising fins extending laterally from each side wall, wherein:
    the fins extend laterally from the side walls at a location lower than the base of the air chamber, optionally, wherein the fins extend laterally from the base of the side walls; and
    the air chamber is an air chamber having a height that is greater than the width.

11. The hull of claim 10, wherein the ratio of the height of the air chamber to the width of the air chamber is at least about 3:2.

12. A water vessel hull comprising an air chamber and at least one air injector configured to deliver air to the air chamber, wherein:
    the air chamber comprises an open base and is enclosed by an upper wall, a fore wall, an aft wall, and sidewalls;
    the sidewalls extend lower than the fore wall and the aft wall; and
    each of the side walls, the fore wall, and the aft wall comprises a stable wall; and
further comprising fins extending laterally from each side wall, wherein:
    the fins extend laterally from the side walls at a location lower than the base of the air chamber, optionally, wherein the fins extend laterally from the base of the side walls; and
    the air chamber is configured to recirculate air.

13. The hull of claim 12, wherein the at least one air injector comprises at least a first air injector configured to discharge air astern along the water surface inside the air chamber, optionally wherein the at least a first air injector is positioned about the water surface and oriented to discharge air astern.

14. The hull of claim 13 wherein the at least a first air injector comprises a plurality of laterally arranged air injectors or a laterally elongated air injector.

* * * * *